(12) United States Patent
Inagaki et al.

(10) Patent No.: US 8,313,861 B2
(45) Date of Patent: *Nov. 20, 2012

(54) NONAQUEOUS ELECTROLYTE BATTERY, BATTERY PACK AND VEHICLE

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,048

(22) Filed: Feb. 8, 2012

(65) Prior Publication Data

US 2012/0141871 A1    Jun. 7, 2012

Related U.S. Application Data

(63) Continuation of application No. 13/151,466, filed on Jun. 2, 2011, now Pat. No. 8,133,619, which is a continuation of application No. 12/897,818, filed on Oct. 5, 2010, now Pat. No. 7,972,730, which is a continuation of application No. 12/691,365, filed on Jan. 21, 2010, now Pat. No. 7,829,224, which is a continuation of application No. 11/261,538, filed on Oct. 31, 2005, now Pat. No. 7,662,515.

(30) Foreign Application Priority Data

Jul. 7, 2005    (JP) ................................. 2005-199445

(51) Int. Cl.
*H01M 4/485* (2010.01)
*H01M 4/66* (2006.01)
*H01M 4/02* (2006.01)

(52) U.S. Cl. ................ 429/231.5; 429/231.95; 429/233; 429/209

(58) Field of Classification Search ............. 429/231.95, 429/223, 224, 209, 231.5, 7, 152, 211, 231.8, 429/233

See application file for complete search history.

(56) References Cited

U.S. PATENT DOCUMENTS

| | | |
|---|---|---|
| 7,462,425 B2 | 12/2008 | Takami et al. |
| 7,482,090 B2 | 1/2009 | Tatebayashi et al. |
| 7,582,386 B2 | 9/2009 | Takami et al. |
| 7,595,134 B2 | 9/2009 | Inagaki et al. |
| 7,601,463 B2 | 10/2009 | Inagaki et al. |
| 7,629,081 B2 | 12/2009 | Inagaki et al. |
| 7,662,515 B2 | 2/2010 | Inagaki et al. |

(Continued)

FOREIGN PATENT DOCUMENTS

JP    9-199179    7/1997

(Continued)

*Primary Examiner* — Jonathan Crepeau
*Assistant Examiner* — Kenneth Douyette
(74) *Attorney, Agent, or Firm* — Oblon, Spivak, McClelland, Maier & Neustadt, L.L.P.

(57) ABSTRACT

A nonaqueous electrolyte battery includes a negative electrode including a current collector and a negative electrode active material having a Li ion insertion potential not lower than 0.4V (vs. $Li/Li^+$). The negative electrode has a porous structure. A pore diameter distribution of the negative electrode as determined by a mercury porosimetry, which includes a first peak having a mode diameter of 0.01 to 0.2 μm, and a second peak having a mode diameter of 0.003 to 0.02 μm. A volume of pores having a diameter of 0.01 to 0.2 μm as determined by the mercury porosimetry is 0.05 to 0.5 mL per gram of the negative electrode excluding the weight of the current collector. A volume of pores having a diameter of 0.003 to 0.02 μm as determined by the mercury porosimetry is 0.0001 to 0.02 mL per gram of the negative electrode excluding the weight of the current collector.

15 Claims, 6 Drawing Sheets

U.S. PATENT DOCUMENTS

| | | |
|---|---|---|
| 7,803,483 B2 | 9/2010 | Takami et al. |
| 7,811,703 B2 | 10/2010 | Fujita et al. |
| 7,829,224 B2 | 11/2010 | Inagaki et al. |
| 7,833,664 B2 | 11/2010 | Fujita et al. |
| 7,858,234 B2 | 12/2010 | Morishima et al. |
| 7,887,955 B2 | 2/2011 | Saruwatari et al. |
| 7,892,674 B2 | 2/2011 | Takami et al. |
| 7,923,152 B2 | 4/2011 | Inagaki et al. |
| 7,927,740 B2 | 4/2011 | Inagaki et al. |
| 7,972,730 B2 | 7/2011 | Inagaki et al. |
| 8,039,151 B2 | 10/2011 | Inagaki et al. |
| 8,088,514 B2 | 1/2012 | Takami et al. |
| 2002/0006548 A1 | 1/2002 | Tsutsue et al. |
| 2002/0037458 A1 | 3/2002 | Yamaguchi et al. |
| 2002/0086210 A1 | 7/2002 | Naruoka et al. |
| 2005/0064282 A1 | 3/2005 | Inagaki et al. |
| 2005/0069777 A1 | 3/2005 | Takami et al. |
| 2005/0221173 A1 | 10/2005 | Tatebayashi et al. |
| 2005/0221187 A1 | 10/2005 | Inagaki et al. |
| 2005/0221188 A1 | 10/2005 | Takami et al. |
| 2006/0068272 A1 | 3/2006 | Takami et al. |
| 2006/0134520 A1 | 6/2006 | Ishii et al. |
| 2007/0042264 A1 | 2/2007 | Desilvestro et al. |
| 2007/0072080 A1 | 3/2007 | Inagaki et al. |
| 2007/0281214 A1 | 12/2007 | Saruwatari et al. |
| 2008/0176142 A1 | 7/2008 | Inagaki et al. |
| 2008/0241692 A1 | 10/2008 | Saruwatari et al. |
| 2009/0169997 A1 | 7/2009 | Saruwatari et al. |
| 2009/0291354 A1 | 11/2009 | Inagaki et al. |

FOREIGN PATENT DOCUMENTS

| | | |
|---|---|---|
| JP | 09-309728 | 12/1997 |
| JP | 2005-72008 | 3/2005 |
| JP | 2005-123183 | 5/2005 |
| JP | 2005-158721 A | 6/2005 |
| WO | WO 2005/018038 | 2/2005 |
| WO | WO 2005-057690 | 6/2005 |

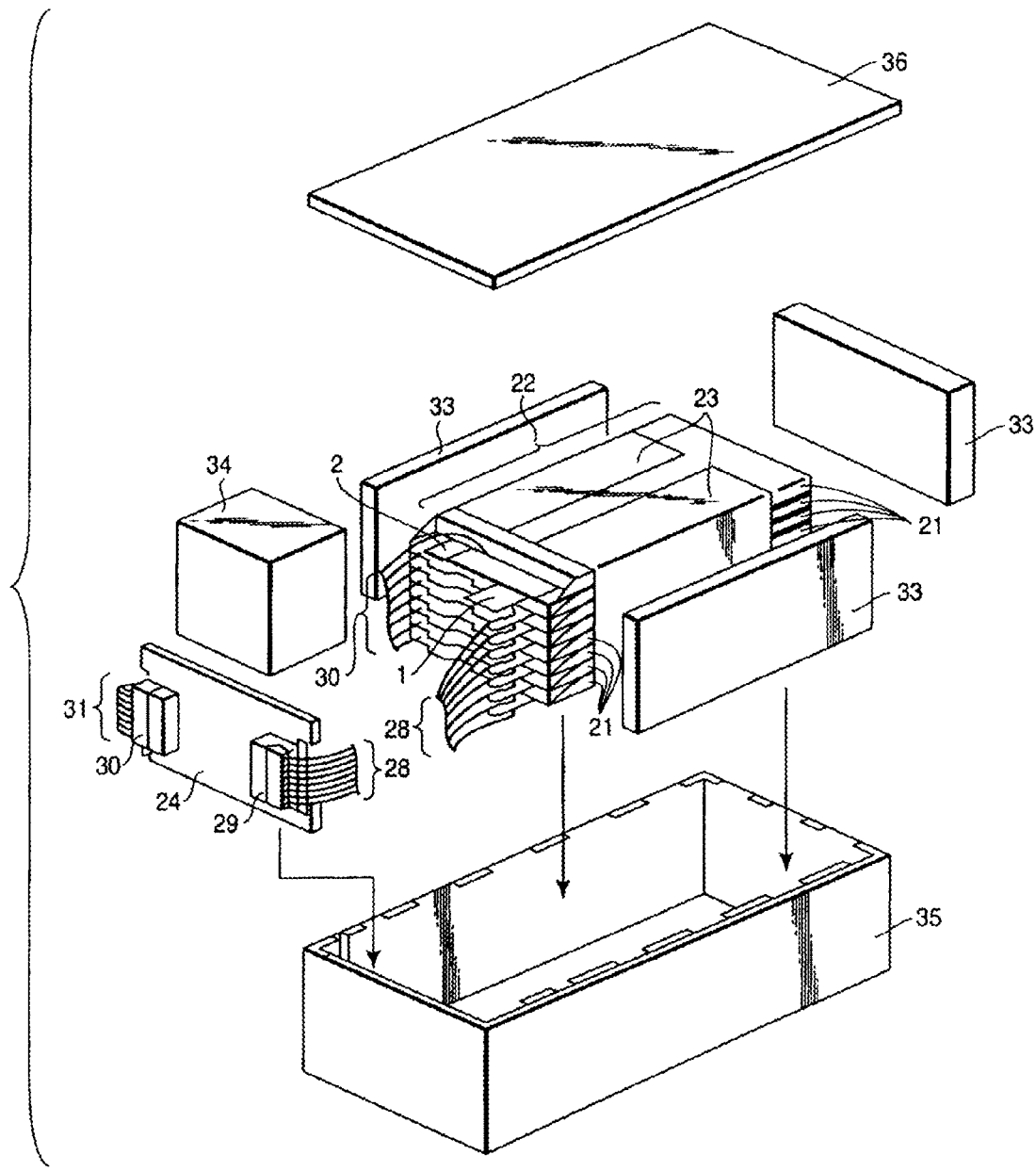
F I G. 5

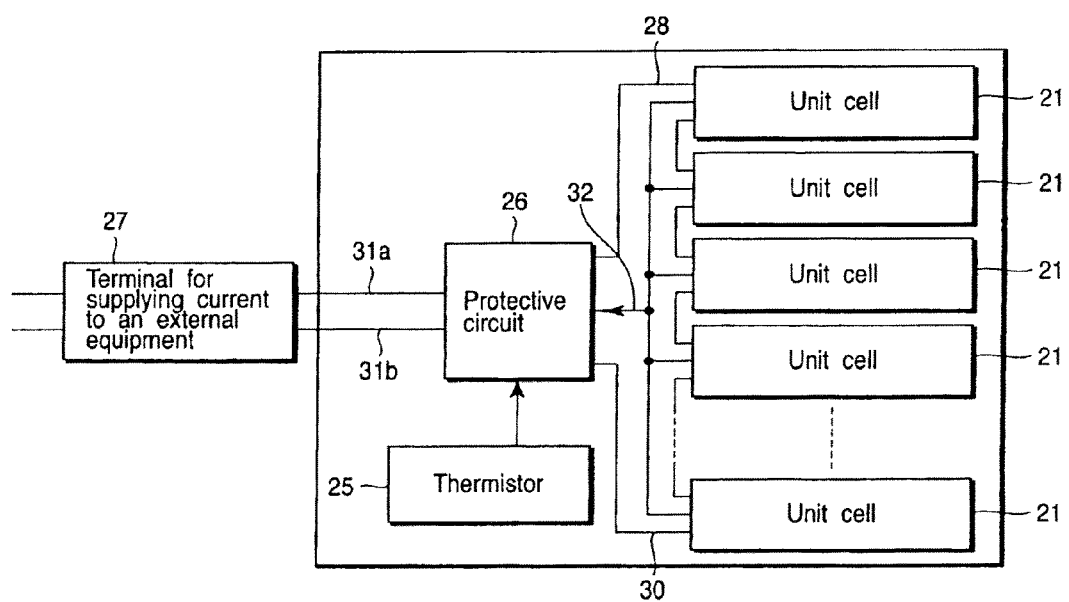
F I G. 6

NONAQUEOUS ELECTROLYTE BATTERY, BATTERY PACK AND VEHICLE

CROSS-REFERENCE TO RELATED APPLICATIONS

This application is a continuation of U.S. application Ser. No. 13/151,466, filed Jun. 2, 2011, now U.S. Pat. No. 8,133,619, which is a continuation of and claims the benefit of priority under 35 U.S.C. §120 from U.S. Ser. No. 12/897,818, filed Oct. 5, 2010, now U.S. Pat. No. 7,972,730, which is a continuation of U.S. Ser. No. 12/691,365, filed Jan. 21, 2010, now U.S. Pat. No. 7,829,224, which is a continuation application of U.S. Ser. No. 11/261,538, filed Oct. 31, 2005, now U.S. Pat. No. 7,662,515, and is based upon and claims the benefit of priority from prior Japanese Patent Application No. 2005-199445, filed Jul. 7, 2005, the entire contents of each of which are incorporated herein by reference.

BACKGROUND OF THE INVENTION

1. Field of the Invention

The present invention relates to a nonaqueous electrolyte battery, a battery pack using the nonaqueous electrolyte battery, and a vehicle having the battery pack mounted thereto.

2. Description of the Related Art

Vigorous research is being conducted on a nonaqueous electrolyte battery in which the battery is charged and discharged by the migration of lithium ions between the negative electrode and the positive electrode in an attempt to develop a high energy density battery.

The nonaqueous electrolyte battery is required to satisfy various characteristics depending on the use of the battery. For example, it is desirable for the nonaqueous electrolyte battery used as a power source of a digital camera to achieve the discharge not lower than about 3 C, and for the nonaqueous electrolyte battery mounted to a vehicle such as a hybrid automobile to achieve the discharge not lower than about 10 C. Such being the situation, the nonaqueous electrolyte battery used in the fields exemplified above is required to exhibit an excellent charge-discharge cycle life when the charge-discharge is repeated under a large current.

The nonaqueous electrolyte battery available on the market nowadays comprises a positive electrode in which a lithium-transition metal composite oxide is used as the positive electrode active material and a negative electrode in which a carbonaceous material is used as the negative electrode active material. In general, Co, Mn, Ni, etc. are used as the transition metals contained in the lithium-transition metal composite oxide used as the positive electrode active material.

In recent years, a nonaqueous electrolyte battery in which lithium-titanium oxide having a high Li ion insertion potential, compared with the carbonaceous material, is used as a negative electrode active material has been put to the practical use. The lithium-titanium oxide is small in change of volume accompanying the charge-discharge operation of the secondary battery, and, thus, permits the nonaqueous electrolyte battery using the lithium-titanium oxide as the negative electrode active material to be excellent in the charge-discharge cycle characteristics, compared with the nonaqueous electrolyte battery using the carbonaceous material as the negative electrode active material. Particularly, it is desirable to use lithium titanate having a spinel structure as the negative electrode active material.

For example, Japanese Patent Disclosure (Kokai) No. 09-199179 discloses a nonaqueous electrolyte battery comprising lithium titanate, which is small in change of volume during the charge-discharge operation of the secondary battery, as the negative electrode active material. It is taught that the nonaqueous electrolyte battery is small in change of volume, and that the short circuiting and the decrease of the battery capacity accompanying the swelling of the electrode are unlikely to take place.

On the other hand, Japanese Patent Disclosure (Kokai) No. 2005-72008 discloses a negative electrode active material formed of vanadium oxide represented by $Li_xM_yV_zO_{2+d}$. It is disclosed that negative electrode active material has pores having a pore diameter of 0.1 to 10 µm and that the pore volume per unit weight of the negative electrode active material is $10^{-3}$ cc/g to 0.8 cc/g.

BRIEF SUMMARY OF THE INVENTION

An object of the present invention is to provide a nonaqueous electrolyte battery excellent in the charge-discharge cycle life, a battery pack using the nonaqueous electrolyte battery, and a vehicle using the battery pack.

According to a first aspect of the present invention, there is provided a nonaqueous electrolyte battery, comprising:
a positive electrode;
a negative electrode including a current collector and a negative electrode layer being supported by the current collector, and the negative electrode layer containing a negative electrode active material having a Li ion insertion potential not lower than 0.4V (vs. $Li/Li^+$); and
a nonaqueous electrolyte;
wherein:
the negative electrode has a porous structure;
a pore diameter distribution of the negative electrode as determined by a mercury porosimetry, which includes a first peak having a mode diameter falling within a range of 0.01 to 0.2 µm, and a second peak having a mode diameter falling within a range of 0.003 to 0.02 µm;
a volume of pores having a diameter of 0.01 to 0.2 µm as determined by the mercury porosimetry is 0.05 to 0.5 mL per gram of the negative electrode excluding the weight of the current collector; and
a volume of pores having a diameter of 0.003 to 0.02 µm as determined by the mercury porosimetry is 0.0001 to 0.02 mL per gram of the negative electrode excluding the weight of the current collector.

According to a second aspect of the present invention, there is provided a nonaqueous electrolyte battery, comprising:
a positive electrode,
a negative electrode including a current collector and a negative electrode layer being supported by the current collector, and the negative electrode layer containing a lithium-titanium oxide; and
a nonaqueous electrolyte;
wherein:
the negative electrode has a porous structure;
a pore diameter distribution of the negative electrode as determined by a mercury porosimetry, which includes a first peak having a mode diameter falling within a range of 0.01 to 0.2 µm, and a second peak having a mode diameter falling within a range of 0.003 to 0.02 µm;
a volume of pores having a diameter of 0.01 to 0.2 µm as determined by the mercury porosimetry is 0.05 to 0.5 mL per gram of the negative electrode excluding the weight of the current collector; and
a volume of pores having a diameter of 0.003 to 0.02 µm as determined by the mercury porosimetry is 0.0001 to 0.02 mL per gram of the negative electrode excluding the weight of the current collector.

According to a third aspect of the present invention, there is provided a battery pack comprising nonaqueous electrolyte batteries, each nonaqueous electrolyte battery comprising:

a positive electrode;

a negative electrode including a current collector and a negative electrode layer being supported by the current collector, the negative electrode layer containing a negative electrode active material having a Li ion insertion potential not lower than 0.4V (vs. Li/Li$^+$); and a nonaqueous electrolyte;

wherein:

the negative electrode has a porous structure;

a pore diameter distribution of the negative electrode as determined by a mercury porosimetry, which includes a first peak having a mode diameter falling within a range of 0.01 to 0.2 μm, and a second peak having a mode diameter falling within a range of 0.003 to 0.02 μm;

a volume of pores having a diameter of 0.01 to 0.2 μm as determined by the mercury porosimetry is 0.05 to 0.5 mL per gram of the negative electrode excluding the weight of the current collector; and a volume of pores having a diameter of 0.003 to 0.02 μm as determined by the mercury porosimetry is 0.0001 to 0.02 mL per gram of the negative electrode excluding the weight of the current collector.

According to a fourth aspect of the present invention, there is provided a vehicle comprising a battery pack including nonaqueous electrolyte batteries, each nonaqueous electrolyte battery comprising:

a positive electrode;

a negative electrode including a current collector and a negative electrode layer being supported by the current collector, and the negative electrode layer containing a negative electrode active material having a Li ion insertion potential not lower than 0.4V (vs. Li/Li$^+$); and a nonaqueous electrolyte;

wherein:

the negative electrode has a porous structure;

a pore diameter distribution of the negative electrode as determined by a mercury porosimetry, which includes a first peak having a mode diameter falling within a range of 0.01 to 0.2 μm, and a second peak having a mode diameter falling within a range of 0.003 to 0.02 μm;

a volume of pores having a diameter of 0.01 to 0.2 μm as determined by the mercury porosimetry is 0.05 to 0.5 mL per gram of the negative electrode excluding the weight of the current collector; and a volume of pores having a diameter of 0.003 to 0.02 μm as determined by the mercury porosimetry is 0.0001 to 0.02 mL per gram of the negative electrode excluding the weight of the current collector.

BRIEF DESCRIPTION OF THE SEVERAL VIEWS OF THE DRAWING

FIG. 5 is an oblique view showing in a dismantled fashion the construction of the battery pack according to a second embodiment of the present invention;

FIG. 6 is a block diagram showing the electric circuit of the battery pack shown in FIG. 5;

DETAILED DESCRIPTION OF THE INVENTION

Figure 1:
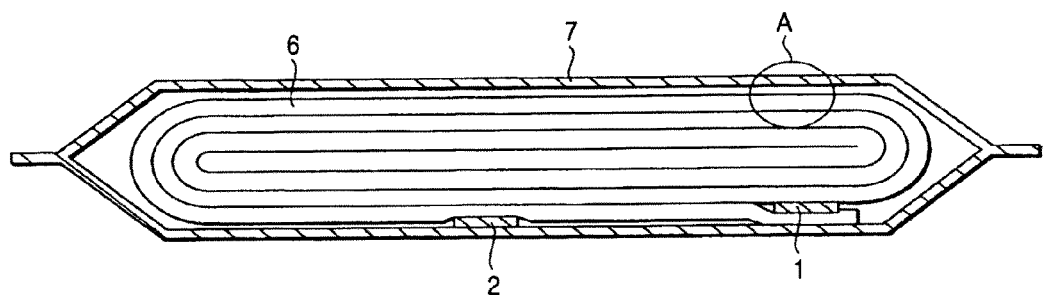
FIG. 1 is a cross sectional view schematically showing the construction of a flat type nonaqueous electrolyte battery according to a first embodiment of the present invention.

A negative electrode active material having a Li ion insertion potential not lower than 0.4V (vs. Li/Li$^+$) is small in the change of volume accompanying the charge-discharge operation of the battery, i.e., the absorption and release of lithium ions. The electrode containing this particular active material is unlikely to be swollen. On the other hand, the negative electrode containing as a negative electrode active material a carbonaceous material that has already been put to the market, such as graphite, exhibits several percent of expansion and shrinkage of the volume in accordance with the charge-discharge operation of the battery. As a result, in the case of using, for example, graphite as the negative electrode active material, the nonaqueous electrolyte is diffused in accordance with expansion and shrinkage of the electrode. It follows that the impregnation of the electrode with a nonaqueous electrolyte tends to be promoted. Alternatively, the concentration of the electrolyte such as a lithium salt tends to be made uniform. It has been found, however, that the electrode containing the lithium-titanium oxide, which is small in the change of volume, is markedly poor in the impregnation capability of the electrode with the nonaqueous electrolyte. Particularly, in the case of manufacturing a large battery that is mounted to, for example, a vehicle, the poor impregnation capability of the electrode with the nonaqueous electrolyte was found to lower the productivity. In addition, the poor impregnation capability of the electrode was also found to markedly lower the battery performance, particularly, the charge-discharge cycle life.

Under the circumstances, the present inventors insistently stirred strongly the slurry in the manufacturing stage of the negative electrode in an attempt to manufacture a negative electrode exhibiting a Li ion insertion potential not lower than 0.4V (vs. Li/Li$^+$), i.e., a negative electrode absorbing-releasing lithium ions under potentials nobler by 0.4V or more relative to the lithium metal potential. As a result, it was possible to suppress the agglomeration of particles to permit the particles to be dispersed uniformly, leading to the successful manufacture of the porous negative electrode having a pore diameter distribution having a sharp peak within a diameter range of 0.01 to 0.2 μm and a sub-peak within a diameter range of 0.003 to 0.02 μm. The present inventors have further continued the research to find that constructions (A) and (B) given below are highly effective for markedly improving the impregnation capability of the negative electrode with the nonaqueous electrolyte to improve not only the productivity but also the large current characteristics and the charge-discharge cycle life of the battery:

(A) The volume of the first pores having a diameter of 0.01 to 0.2 μm should be 0.05 to 0.5 mL per gram of the negative electrode excluding the weight of the negative electrode current collector.

(B) The volume of the second pores having a diameter of 0.003 to 0.02 µm should be 0.0001 to 0.02 mL per gram of the negative electrode excluding the weight of the negative electrode current collector.

Since fine pores are uniformly distributed in the negative electrode, the high impregnation capability of the negative electrode can be retained without lowering the electrode density. As a result, it is possible to increase the density of the electrode, leading to a high capacity of the battery.

Further, in the case of using a positive electrode containing the spinel type lithium-manganese-nickel composite oxide as the positive electrode active material together with the negative electrode noted above, it is also possible to increase the voltage of the battery. Alternatively, in the case of using a lithium-phosphorus composite oxide having the olivine structure such as $Li_xFePO_4$, $Li_xFe_{1-x}Mn_yPO_4$, $Li_xVPO_4F$, or $Li_xCoPO_4$, where each of x and y falls within a range of 0 to 1, i.e., $0 \leq x \leq 1$; $0 \leq y \leq 1$, it is possible to realize a nonaqueous electrolyte battery excellent in the thermal stability.

Some embodiments of the present invention will now be described with reference to the accompanying drawings. Incidentally, the common constituents of the invention are denoted by the same reference numerals in the accompanying drawings to omit the overlapping description. Also, the accompanying drawings are schematic drawings that are simply intended to facilitate the description and understanding of the invention. It is possible for the shape, the size, the ratio, etc. shown in the drawing to differ from those of the actual battery. Of course, the design relating to the size, shape, etc. can be changed appropriately in view of the description given below and the known technology.

FIRST EMBODIMENT

An example of the construction of the unit cell, i.e., non-aqueous electrolyte battery, according to the first embodiment of the present invention will now be described with reference to FIGS. 1 and 2. Specifically, FIG. 1 is a cross sectional view schematically showing the construction of a flat type nonaqueous electrolyte battery according to a first embodiment of the present invention, and FIG. 2 is a cross sectional view schematically showing in detail in a magnified fashion the construction of the circular region A of the nonaqueous electrolyte battery shown in FIG. 1.

As shown in FIG. 1, a flat type wound electrode group 6 is housed in a case 7. The wound electrode group 6 is formed of a laminate structure comprising a positive electrode 3, a negative electrode 4, and a separator 5 interposed between the positive electrode 3 and the negative electrode 4. The electrode group 6 is obtained by spirally winding the laminate structure noted above. Further, a nonaqueous electrolyte is retained by the wound electrode group 6.

Figure 2:
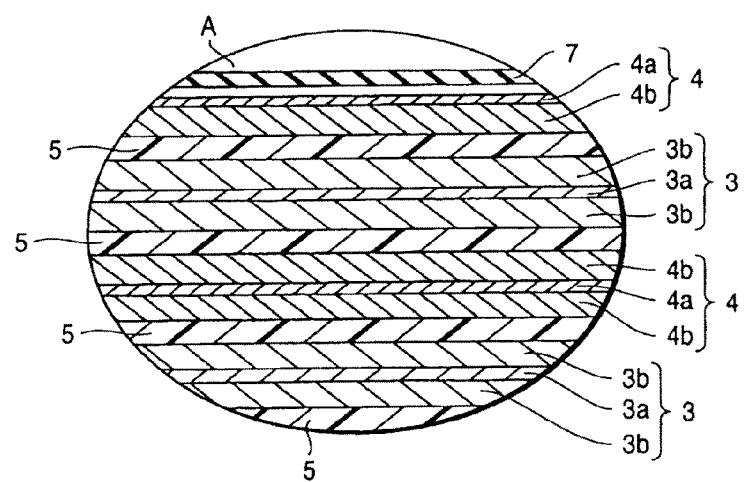
FIG. 2 is a cross sectional view showing in detail in a magnified fashion the construction of the circular region A of the nonaqueous electrolyte battery shown in FIG. 1.

As shown in FIG. 2, the negative electrode 4 is positioned to constitute the outermost circumferential region of the wound electrode group 6. Also, the positive electrode 3 and the negative electrode 4 are alternately laminated one upon the other with the separator 5 interposed therebetween. For example, the separator 5, the positive electrode 3, the separator 5, the negative electrode 4, the separator 5, the positive electrode 3 and the separator 5 are laminated one upon the other in the order mentioned. The negative electrode 4 comprises a negative electrode current collector 4a and a negative electrode active material-containing layer 4b supported by the negative electrode current collector 4a. The negative electrode active material-containing layer 4b is porous. In that region of the negative electrode 4 which constitutes the outermost circumferential region, the negative electrode active material-containing layer 4b is formed on one surface of the negative electrode current collector 4a. On the other hand, the positive electrode 3 comprises a positive electrode current collector 3a and a positive electrode active material-containing layer 3b supported by the positive electrode current collector 3a.

As shown in FIG. 1, a band-like positive electrode terminal 1 is electrically connected to the positive electrode current collector 3a in the vicinity of the outer circumferential region of the wound electrode group 6. On the other hand, a band-like negative electrode terminal 2 is electrically connected to the negative electrode current collector 4a in the vicinity of the outer circumferential region of the wound electrode group 6. Further, the tip portions of the positive electrode terminal 1 and the negative electrode terminal 2 are withdrawn to the outside of the case 7 via the same side of the case 7.

The negative electrode, the nonaqueous electrolyte, the positive electrode, the separator, the case, the positive electrode terminal and the negative electrode terminal will now be described in detail.

1) Negative Electrode

As described previously, the negative electrode active material exhibits a Li ion insertion potential not lower than 0.4V (vs. $Li/Li^+$). In the case of using an active material capable of absorbing lithium or lithium ions at a potential baser than 0.4V (vs. $Li/Li^+$), e.g., graphite, lithium metal, or the vanadium oxide represented by $Li_xM_yV_zO_{2+d}$, which is disclosed in Japanese Patent Disclosure (Kokai) No. 2005-72008 referred to previously, the reducing reaction of the nonaqueous electrolyte proceeds excessively on the surface of the active material if the diameter of the particles forming the negative electrode is diminished to markedly lower the battery characteristics, particularly, the output characteristics and the charge-discharge cycle life. The particular phenomenon is caused to appear prominently, if the diameter of the active material particles absorbing lithium or lithium ions at a potential baser than 0.2V (vs. $Li/Li^+$) is set smaller than 1 µm. It follows that it is desirable for the Li ion insertion potential of the negative electrode active material to be not lower than 0.4V (vs. $Li/Li^+$) and for the upper limit of the Li ion insertion potential of the negative electrode active material to be set at 3V (vs. $Li/Li^+$), preferably at 2V (vs. $Li/Li^+$).

The negative electrode active material having the Li ion insertion potential falling within a range of 0.4 to 3V (vs. $Li/Li^+$) includes a metal oxide, a metal sulfide, a metal nitride or an alloy.

The metal oxide that can be used as the negative electrode active material includes, for example, a titanium-containing metal composite oxide, a tin-containing oxide such as $SnB_{0.4}P_{0.6}O_{3.1}$ or $SnSiO_3$, a silicon-containing oxide such as SiO, and tungsten-containing oxide such as $WO_3$. Particularly, it is desirable to use a titanium-containing metal composite oxide as the negative electrode active material.

The titanium-containing metal composite oxide noted above includes, for example, a titanium-based oxide that does not contain lithium in the stage of synthesizing the oxide, lithium-titanium oxide, and a lithium-titanium composite oxide obtained by substituting a foreign element for a part of the constituting elements of the lithium-titanium oxide. The lithium-titanium oxide includes, for example, lithium titanate having a spinel structure, e.g., $Li_{4+x}Ti_5O_{12}$ ($0 \leq x \leq 3$), and lithium titanate having a ramsdellite structure, e.g., $Li_{2+y}Ti_3O_7$ ($0 \leq y \leq 3$).

The titanium-based oxide noted above includes, for example, $TiO_2$ and a metal composite oxide containing Ti and at least one element selected from the group consisting of P, V, Sn, Cu, Ni, Co and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni, Co and Fe includes, for example, $TiO_2$—$P_2O_5$, $TiO_2$—$V_2O_5$, $TiO_2$—$P_2O_5$—$SnO_2$, and $TiO_2$—$P_2O_5$-MeO (Me denoting at least one element selected from the group consisting of Cu, Ni, Co and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni, Co and Fe.

The metal sulfide used as the negative electrode active material includes, for example, a Ti-containing sulfide such as $TiS_2$, a molybdenum-containing sulfide such as $MoS_2$ and iron-containing sulfide such as FeS, $FeS_2$, $Li_xFeS_2$ ($0 \leqq x \leqq 4$).

The metal nitride used as the negative electrode active material includes, for example, lithium-containing nitrides such as (Li, Me)$_3$N (where Me denotes a transition metal element.

It is desirable for the negative electrode active material to have an average particle diameter not larger than 1 μm. If the negative electrode active material has an average particle diameter exceeding 1 μm, it may be difficult to permit the negative electrode to have pores having the diameter falling within the range specified in this embodiment of the present invention. If the average particle diameter is excessively small, however, the distribution of the nonaqueous electrolyte is inclined on the negative electrode, with the result that the nonaqueous electrolyte tends to be depleted on the positive electrode. Such being the situation, it is desirable for the lower limit of the average particle diameter in the negative electrode active material to be set at 0.001 μm.

It is desirable for the negative electrode active material to have an average particle diameter not larger than 1 μm and to have a specific surface area falling within a range of 5 to 50 m$^2$/g as determined by the BET method utilizing the $N_2$ adsorption. Where the negative electrode active material has the average particle diameter and the specific surface area noted above, the pore diameter distribution in the negative electrode can be controlled easily to fall within the range specified in the first embodiment of the present invention to make it possible to enhance the impregnation capability of the negative electrode with the nonaqueous electrolyte.

The reasons for defining the pore diameter distribution in the negative electrode to fall within the range referred to above will now be described.

It is desirable for the pores to consist of open cells formed inside the porous material and extending to reach the surface of the porous material (see "Iwanami's Dictionary of Physics and Chemistry 5th Edition CD-ROM). The term "mode diameter" denotes the peak top of a pore diameter distribution curve in a graph in which pore diameter is plotted on the abscissa and the frequency is plotted on the ordinate.

<First Peak>

The first peak is ascribed to the pores formed by the constituents of the negative electrode such as the active material particles, the conductive agent and the binder.

In the first embodiment of the present invention, the mode diameter of the first peak of the pore diameter distribution as determined by the mercury porosimetry is set not to exceed 0.2 μm to promote the impregnation of the negative electrode with the nonaqueous electrolyte performed by the capillary action of the pore. At the same time, the lower limit of the mode diameter is set at 0.01 μm. It should be noted in this connection that the by-products (organic materials or inorganic materials) formed by the reaction with the electrolyte is deposited on the surface of the negative electrode active material or on the surface of the negative electrode conductive agent. If the mode diameter of the first peak is smaller than 0.01 μm, the pores are closed by the growth of the by-product to lower the capability of retaining the nonaqueous electrolyte of the negative electrode, with the result that the charge-discharge cycle characteristics of the battery are lowered. Under the circumstances, it is desirable for the mode diameter of the first peak to fall within a range of 0.01 to 0.2 μm, more desirably to fall within a range of 0.02 to 0.1 μm.

The volume of the first pores, as determined by the mercury porosimetry, having the pore diameters falling within a range of 0.01 to 0.2 μm falls within a range of 0.05 to 0.5 mL per gram of the negative electrode excluding the weight of the negative electrode current collector. For determining the pore volume per unit weight of the negative electrode, the weight of the negative electrode current collector is excluded from the calculation. As described herein later, the negative electrode current collector is formed of a nonporous conductive substrate such as an aluminum foil. Clearly, the negative electrode current collector is irrelevant to the pore diameter distribution. Such being the situation, it is reasonable to subtract the weight of the negative electrode current collector from the weight of the negative electrode in order to obtain the effective pore diameter distribution within the negative electrode. If the specific pore volume is smaller than 0.05 mL/g, the nonaqueous electrolyte is depleted within the negative electrode to lower the charge-discharge cycle characteristics of the battery. On the other hand, if the specific pore volume exceeds 0.5 mL/g, the distribution of the nonaqueous electrolyte is inclined on the negative electrode to bring about depletion of the nonaqueous electrolyte in the positive electrode. It is more desirable for the specific pore volume noted above to fall within a range of 0.1 to 0.3 mL/g.

It is desirable for the surface area of the first pores having a diameter of 0.01 to 0.2 μm, as determined by the mercury porosimetry, per gram of the negative electrode excluding the weight of the negative electrode current collector to fall within a range of 5 to 50 m$^2$. The weight of the negative electrode current collector is excluded from the calculation of the surface area of the pores per gram of the negative electrode because the negative electrode current collector is nonporous and, thus, it is unreasonable to include the weight of the negative electrode current collector in the calculation noted above, as pointed out above. It should be noted that if the specific surface area of the first pores noted above is smaller than 5 m$^2$/g, the effect of promoting the impregnation of the negative electrode with the nonaqueous electrolyte tends to be diminished. On the other hand, if the specific surface area of the first pores noted above exceeds 50 m$^2$/g, it is difficult to increase the electrode density to lower the energy density. In addition, it is possible for the electron conductivity to be lowered to lower the output performance. It is more desirable for the specific surface area of the first pores noted above to fall within a range of 7 to 30 m$^2$/g.

<Second Peak>

The second peak is ascribed to the pores of the negative electrode active material itself.

If the negative electrode has a pore diameter distribution such that the mode diameter of a second peak falls within a range of 0.003 to 0.02 μm as determined by the mercury porosimetry, the impregnation capability of the negative electrode with the nonaqueous electrolyte is markedly improved to improve prominently the large current characteristics. It should be noted that the presence of the second peak in the pore diameter distribution permits effectively promoting the capillary action performed by the pores. However, if the mode diameter of the second peak is smaller than 0.003 µm, the dispersion capability of the electrolyte having a large molecular weight is lowered to give rise to the possibility that the impregnation capability of the negative electrode noted above may be lowered. Such being the situation, it is desirable for the lower limit of the mode diameter of the second peak to be set at 0.003 µm. It is more desirable for the mode diameter of the second peak of the pore diameter distribution to fall within a range of 0.005 to 0.015 µm.

The volume of the second pores having a diameter of 0.003 to 0.02 µm as determined by the mercury porosimetry per gram of the negative electrode excluding the negative electrode current collector should fall within a range of 0.0001 to 0.02 mL. The negative electrode current collector is excluded from the calculation of the volume of the pores per gram of the negative electrode, as described previously. If the specific pore volume noted above is smaller than 0.0001 mL/g, it is impossible to obtain a sufficient effect of improving the impregnation capability of the negative electrode with the nonaqueous electrolyte. On the other hand, if the specific pore volume noted above is larger than 0.02 mL/g, the strength of the negative electrode active material is lowered. As a result, the particles of the negative electrode active material tend to be collapsed in the pressing stage of the electrode to lower the charge-discharge cycle performance and the high rate characteristics of the battery. It is more desirable for the pore volume per gram of the negative electrode to fall within a range of 0.0005 to 0.01 mL/g.

It is desirable for the surface area of the second pores having a diameter of 0.003 to 0.02 µm, as determined by the mercury porosimetry, per gram of the negative electrode excluding the negative electrode current collector to fall within a range of 0.1 to 10 $m^2$. The weight of the negative electrode current collector is excluded from the calculation of the surface area of the pores per unit weight of the negative electrode because the negative electrode current collector is generally formed of a nonporous material such as an aluminum foil, as pointed out previously. If the specific surface area of the second pores is smaller than 0.1 $m^2/g$, it is impossible to obtain a sufficient effect of improving the impregnation capability of the negative electrode with the nonaqueous electrolyte. On the other hand, if the specific surface area of the second pores exceeds 10 $m^2/g$, it is difficult to increase the electrode density and, thus, the energy density tends to be lowered. It is more desirable for the specific surface area of the second pores to fall within a range of 0.2 to 2 $m^2/g$.

It is desirable for the pore volume as determined by the mercury porosimetry per gram of the negative electrode excluding the negative electrode current collector to fall within a range of 0.1 to 1 mL. The weight of the negative electrode current collector is excluded from the calculation of the volume of the pores per unit weight of the negative electrode because the negative electrode current collector is generally formed of a nonporous material, as pointed out previously. If the specific pore volume of the negative electrode is not smaller than 0.1 mL/g, it is possible for the negative electrode to retain a sufficiently large amount of the nonaqueous electrolyte. However, if the specific pore volume is smaller than 0.1 mL/g, the nonaqueous electrolyte tends to be depleted within the negative electrode to lower the charge-discharge cycle characteristics of the battery. It should also be noted in respect of the limitation that the specific pore volume in the negative electrode should not exceed 1 mL/g that, if the specific pore volume is excessively large, the distribution of the nonaqueous electrolyte tends to be inclined on the negative electrode to bring about depletion of the electrolyte on the positive electrode. It is more desirable for the pore volume per unit weight of the negative electrode to fall within a range of 0.2 to 0.5 mL/g.

It is desirable for the surface area of the pores as determined by the mercury porosimetry per gram of the negative electrode excluding the negative electrode current collector to fall within a range of 5 to 50 $m^2$. The weight of the negative electrode current collector is excluded from the calculation of the surface area of the pores per unit weight of the negative electrode because the negative electrode current collector is generally formed of a nonporous material, as pointed out previously. If the specific surface area of the pores is smaller than 5 $m^2/g$, the affinity between the negative electrode and the nonaqueous electrolyte is lowered, with the result that it is possible for the pore diameter distribution described previously to fail to produce a sufficient effect of improving the impregnation capability of the negative electrode with the nonaqueous electrolyte. On the other hand, if the specific surface area noted above exceeds 50 $m^2/g$, the distribution of the nonaqueous electrolyte tends to be inclined on the negative electrode, with the result that shortage of the nonaqueous electrolyte is brought about in the positive electrode, resulting in failure to improve the charge-discharge cycle characteristics of the battery. It is more desirable for the specific surface area of the pores to fall within a range of 7 to 30 $m^2/g$.

It is desirable for the porosity of the negative electrode excluding the negative electrode current collector to fall within a range of 20 to 50%. If the porosity of the negative electrode falls within the range noted above, the affinity between the negative electrode and the nonaqueous electrolyte is improved. In addition, it is possible to obtain a negative electrode having a high density. It is more desirable for the porosity of the negative electrode to fall within a range of 25 to 40%.

It is desirable for the density of the negative electrode to be not lower than 2 g/cc. If the density of the negative electrode is lower than 2 g/cc, it may be difficult to obtain a negative electrode having the pore diameter distribution described previously. It is more desirable for the density of the negative electrode to fall within a range of 2 to 2.5 g/cc.

It is desirable for the current collector of the negative electrode to be formed of aluminum foil or aluminum alloy foil. It is also desirable for the negative electrode current collector to have an average crystal grain size not larger than 50 µm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 µm, furthermore desirably, not larger than 5 µm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ ($\mu m^2$)", where n denotes the number of crystal grains noted above. Further, the average crystal grain size d ($\mu m$) is calculated from the area S by formula (A) given below:

$$d=2(S/\pi)^{1/2} \quad\quad (A)$$

The aluminum foil or the aluminum alloy foil having the average crystal grain size not larger than 50 $\mu m$ can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 $\mu m$, more desirably not larger than 15 $\mu m$. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

It is possible for the negative electrode active material-containing layer to contain a conductive agent. The conductive agent includes, for example, a carbon material, a metal powder such as an aluminum powder, and a conductive ceramic material such as TiO. The carbon material used as the conductive agent includes, for example, acetylene black, carbon black, coke, a carbon fiber and graphite. It is more desirable for the carbon material to include, for example, coke subjected to a heat treatment at 800 to 2,000° C. and having an average particle diameter not larger than 10 $\mu m$, graphite, a TiO powder, and a carbon fiber having an average particle diameter not larger than 1 $\mu m$. It is desirable for the carbon material to have at least 10 $m^2/g$ of the BET specific surface area as determined by the $N_2$ adsorption.

It is also possible for the negative electrode active material-containing layer to contain a binder. The binder includes, for example, polytetrafluoroethylene (PTFE), polyvinylidene fluoride (PVdF), a fluorinated rubber, styrene-butadiene rubber and a core shell binder.

Concerning the mixing ratio of the negative electrode active material, the negative electrode conductive agent, and the binder, it is desirable for the negative electrode active material to be used in an amount not smaller than 70% by weight and not larger than 96% by weight, for the negative electrode conductive agent to be used in an amount not smaller than 2% by weight and not larger than 28% by weight, and for the binder to be used in an amount not smaller than 2% by weight and not larger than 28% by weight. If the mixing amount of the negative electrode conductive agent is smaller than 2% by weight, the current collecting performance of the negative electrode porous layer may be lowered to possibly lower the large current characteristics of the nonaqueous electrolyte battery. Also, if the mixing amount of the binder is smaller than 2% by weight, the bonding between the negative electrode porous layer and negative electrode current collector may be lowered to possibly lower the charge-discharge cycle characteristics of the nonaqueous electrolyte battery. On the other hand, it is desirable for the mixing amount of each of the negative electrode conductive agent and the binder to be not larger than 28% by weight in view of the improvement in the capacity of the nonaqueous electrolyte battery.

The negative electrode can be prepared by, for example, coating a negative electrode current collector with a slurry prepared by suspending a negative electrode active material, a negative electrode conductive agent and a binder in a solvent that is used widely, followed by drying the current collector coated with the slurry to form a negative electrode porous layer and subsequently pressing the negative electrode porous layer. In manufacturing the negative electrode, the slurry is prepared as follows. In the first step, a negative electrode active material, a negative electrode conductive agent and a binder are put in a small amount of the solvent. These materials are kneaded with, for example, a planetary mixer under the state of a high solid material ratio, i.e., the state that the ratio of the solid materials including the negative electrode active material, the negative electrode conductive agent and the binder to the solvent is high, to apply a strong shearing force to the mixture and, thus, to disperse uniformly the solid components of the mixture. It should be noted that, if the solid material ratio is not sufficiently high, the shearing force is decreased, with the result that the agglomerated negative electrode active material is not pulverized sufficiently, resulting in failure for the solid components to be dispersed uniformly. The kneading process noted above is rendered more important with increase in the fineness of the particle diameter of the negative electrode active material. The kneading process is particularly important in the case of handling the particles having an average particle diameter not larger than 1 $\mu m$. After the mixture is kneaded sufficiently under the state of a high ratio of the solid components, the solid component ratio is gradually lowered while adding a solvent to adjust the slurry at a viscosity adapted for the coating. The slurry adjusted at a viscosity adapted for the coating is mixed sufficiently by using a bead mill including ceramic balls used as a mixing medium. In this mixing step, the edges of the particles of the active material are scraped off to smoothen the surface of the particles of the active material. As a result, the negative electrode active material can be loaded at a high loading density to shift the pore diameter distribution toward the small diameter, thereby making it possible to obtain a negative electrode having the pore diameter distribution specified in the this embodiment of the present invention. The ceramic balls used in the bead mill can be formed of various materials such as glass, alumina, mullite, and silicon nitride. In view of the wear resistance and the impact resistance, it is desirable to use zirconia balls as the ceramic balls. It is desirable for the ball to have a diameter of 0.5 to 5 mm. If the diameter of the ball is smaller than 0.5 mm, it is difficult to obtain a sufficiently large impact force. On the other hand, if the diameter of the ball is larger than 5 mm, the contact area among the adjacent balls is excessively diminished to lower the kneading capability of the balls. It is more desirable for the balls to have a diameter falling within a range of 1 to 3 mm.

The negative electrode current collector is coated with the slurry thus obtained, followed by drying the slurry and subsequently pressing the negative electrode current collector coated with the slurry by a roll press machine to finish manufacture of the negative electrode. It is desirable for the roll temperature to fall within a range of 40 to 180° C. If the roll temperature is excessively low, the conductive agent having a specific gravity lower than that of the negative electrode active material is caused to float on the surface of the electrode in the pressing stage, resulting in failure to obtain a high density electrode having appropriate pores. It follows that the impregnation capability of the negative electrode with the electrolyte is lowered. In addition, the battery performance is also lowered. On the other hand, if the roll temperature is higher than 180° C., the crystallization proceeds in the binder to lower the flexibility of the electrode. It follows that the negative electrode porous layer tends to be folded or peeled off. As a result, the productivity is lowered. In addition, the battery performance such as the output characteristics and the charge-discharge cycle characteristics is also lowered. It is more desirable for the roll temperature to fall within a range of 90 to 150° C.

2) Nonaqueous Electrolyte

The nonaqueous electrolyte includes a liquid nonaqueous electrolyte that is prepared by dissolving an electrolyte in an organic solvent and a gel-like nonaqueous electrolyte that is prepared by using a composite material containing a liquid nonaqueous electrolyte and a polymer material.

Also, it is possible to permit the nonaqueous electrolyte to contain a room temperature molten salt formed of a non-combustible ionic liquid that is not volatile.

The liquid nonaqueous electrolyte can be prepared by dissolving an electrolyte in an organic solvent in a concentration of 0.5 to 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonyl imide lithium [$LiN(CF_3SO_2)_2$], and a mixture thereof. It is desirable to use an electrolyte that is unlikely to be oxidized under a high potential. Particularly, it is most desirable to use $LiPF_6$ as the electrolyte.

The organic solvent includes, for example, cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2Me THF) and dioxolane (DOX); linear ethers such as dimethoxy ethane (DME), and diethoxy ethane (DEE); as well as γ-butyrolactone (GBL), acetonitrile (AN) and sulfolane (SL). These solvents can be used singly or in the form of a mixed solvent.

The polymer materials include, for example, polyvinylidene fluoride (PVdF), polyacrylonitrile (PAN) and polyethylene oxide (PEO).

It is desirable to use a mixed solvent prepared by mixing at least two organic solvents selected from the group consisting of propylene carbonate (PC), ethylene carbonate (EC) and γ-butyrolactone (GBL). It is more desirable to use γ-butyrolactone (GBL) as the organic solvent. The reasons why these organic compounds can be used as excellent solvents are as follows.

First of all, each of γ-butyrolactone, propylene carbonate and ethylene carbonate has a high boiling point and a high ignition point and is excellent in the thermal stability.

Secondly, the titanium-containing metal composite oxide such as the lithium-titanium oxide absorbs and releases the lithium ions within the potential region in the vicinity of 1.5V (vs. Li/Li$^+$). However, it is impossible to form sufficiently a film made of the reduction product of the nonaqueous electrolyte on the surface of the lithium-titanium oxide particle within the potential region noted above, though it is certainly possible to allow the nonaqueous electrolyte to be reduced and decomposed within the potential region noted above. Therefore, if the battery is stored under the charged state, the lithium ions absorbed in the lithium-titanium composite oxide is gradually diffused into the nonaqueous electrolyte to bring about a so-called "self-discharge". The self-discharge is generated prominently if the battery is stored under an environment of a high temperature.

If the pore size and pore volume of the negative electrode are controlled as described in the first embodiment of the present invention, the contact area between the negative electrode and the nonaqueous electrolyte is increased, with the result that the self-discharge noted above tends to be somewhat increased.

It should be noted that γ-butyrolactone tends to be reduced easily, compared with the linear carbonate and the cyclic carbonate. To be more specific, the solvents tend to be reduced in the order of γ-butyrolactone>>>ethylene carbonate>propylene carbonate>>dimethyl carbonate>methyl ethyl carbonate>diethyl carbonate in the order mentioned. Incidentally, the degree of difference in reactivity among the solvents is increased with increase in the number of signs of inequality ">" noted above.

Such being the situation, if γ-butyrolactone is contained in the nonaqueous electrolyte, a satisfactory film is formed on the surface of the negative electrode even under the operating potential region of the lithium-titanium oxide. As a result, the self-discharge of the battery is suppressed to improve the storage characteristics of the nonaqueous electrolyte battery under high temperatures.

This is also the case with the mixed solvent noted above.

Also, a similar effect can be obtained in the case of using the ionic liquid that can be reduced easily. It should also be noted that the ionic liquid also tends to be oxidized easily. Therefore, in the case of using the ionic liquid, the ionic liquid acts on the positive electrode to produce the effect of suppressing the self-discharge and the effect of improving the charge-discharge cycle life.

In order to form a more satisfactory protective film, it is desirable for the mixture of the organic solvents to contain 40 to 95% by volume of γ-butyrolactone.

The nonaqueous electrolyte containing γ-butyrolactone, which exhibits excellent effects as described above, has a high viscosity to lower the impregnation capability of the negative electrode with the nonaqueous electrolyte. However, in the case of using the negative electrode specified in the first embodiment of the present invention, the negative electrode is allowed to be impregnated smoothly with the nonaqueous electrolyte even if the nonaqueous electrolyte contains γ-butyrolactone to improve the productivity and to improve the output characteristics and the charge-discharge cycle characteristics of the battery. It is also possible to obtain a similar effect in the case of using the ionic liquid because of high viscosity. It follows that the negative electrode in the first embodiment of the present invention produces prominent effects in the case of using the nonaqueous electrolyte containing γ-butyrolactone or an ionic liquid having a viscosity not lower than 5 cp at 20° C.

It is possible to set the upper limit of the viscosity of the nonaqueous electrolyte at 20° C. at 30 cp.

The nonaqueous electrolyte containing the ionic liquid will now be described.

The ionic liquid denotes a salt which partly exhibits a liquid state under the room temperature. The term "room temperature" denotes the temperature range within which the power source is assumed to be operated in general. The upper limit of the temperature range within which the power source is assumed to be operated in general is about 120° C., or about 60° C. in some cases, and the lower limit is about −40° C. or about −20° C. in some cases. It is desirable for the room temperature to fall within a range of −20° C. to 60° C.

The ionic liquid should desirably contain lithium ions, organic cations and organic anions. It is desirable for the ionic liquid to assume a liquid form even under the temperature not higher than room temperature.

The organic cation noted above includes, for example, quaternary ammonium ion and alkyl imidazolium ion having a skeleton represented by chemical formula (I) given below:

(1)

It is desirable to use dialkyl imidazolium ion, trialkyl imidazolium ion and tetraalkyl imidazolium ion as the alkyl imidazolium ion noted above. The dialkyl imidazolium ion includes, for example, 1-methyl-3-ethyl imidazolium ion ($MEI^+$). The trialkyl imidazolium ion includes, for example, 1,2-diethyl-3-propyl imidazolium ion ($DMPI^+$). And the tetraalkyl imidazolium ion includes 1,2-diethyl-3,4(5)-dimethyl imidazolium ion.

On the other hand, the quaternary ammonium ion includes tetraalkyl ammonium ion and cyclic ammonium ion. The tetraalkyl ammonium ion noted above includes dimethyl ethyl methoxy ammonium ion, dimethyl ethyl methoxy methyl ammonium ion, dimethyl ethyl ethoxy ethyl ammonium ion, and trimethyl propyl ammonium ion.

In the case of using the alkyl imidazolium ion or the quaternary ammonium ion (particularly, tetraalkyl ammonium ion) as the organic cation, it is possible to lower the melting point of the nonaqueous electrolyte to 100° C. or less, more desirably to 20° C. or less. Further, it is possible to suppress the reactivity of the nonaqueous electrolyte with the negative electrode.

It is desirable for the lithium ion concentration to be not higher than 20 mol %, more desirably to fall within a range of 1 to 10 mol %. Where the lithium ion concentration falls within the range given above, the ionic liquid can be formed easily even under the low temperature not higher than 20° C. It is also possible to lower the viscosity of the nonaqueous electrolyte even under the temperature not higher than the room temperature to increase the ionic conductivity.

The anion contained in the ionic liquid is selected from the group consisting of, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. It is desirable for the organic cation noted above to be present together with at least one anion selected from the group given above. Where a plurality of anions are present together, an ionic liquid having a melting point not higher than 20° C. can be formed easily. More desirably, it is possible to obtain an ionic liquid having a melting point not higher than 0° C. More desirable anions include, for example, $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. Where these anions are used, an ionic liquid having a melting point not higher than 0° C. can be formed easily.

3) Positive Electrode

The positive electrode includes a positive electrode current collector and a positive electrode active material-containing layer supported on one surface or both surfaces of the positive electrode current collector and containing a positive electrode active material, positive electrode conductive agent and a binder.

The positive electrode active material includes, for example, an oxide, a sulfide and a polymer.

The oxides include, for example, manganese dioxide ($MnO_2$) absorbing Li, iron oxide, copper oxide, nickel oxide, a lithium-manganese composite oxide (e.g., $Li_xMn_2O_4$ or $Li_xMnO_2$), a lithium-nickel composite oxide, e.g., $Li_xNiO_2$, a lithium-cobalt composite oxide (e.g., $Li_xCoO_2$), a lithium-nickel-cobalt composite oxide, e.g., $LiNi_{1-y}Co_yO_2$, a lithium-manganese-cobalt composite oxide (e.g., $LiMn_yCo_{1-y}O_2$), a spinel type lithium-manganese-nickel composite oxide (e.g., $Li_xMn_{2-y}Ni_yO_4$), a lithium phosphorus oxide having an olivine structure (e.g., $Li_xFePO_4$, $Li_xFe_{1-x}Mn_yPO_4$, $Li_xVPO_4F$, and $Li_xCoPO_4$ ($0 \leq x \leq 1$, $0 \leq y \leq 1$), iron sulfate ($Fe_2(SO_4)_3$), vanadium oxide (e.g., $V_2O_5$), and a lithium-nickel-cobalt-manganese composite oxide.

The polymer includes, for example, a conductive polymer material such as polyaniline or polypyrrole, and a disulfide based polymer material. It is also possible to use sulfur (S) and a fluorocarbon as the positive electrode active material.

The positive electrode active material that permits obtaining a high positive electrode voltage includes, for example, a lithium-manganese composite oxide ($Li_xMn_2O_4$), a lithium-nickel composite oxide ($Li_xNiO_2$), a lithium-cobalt composite oxide ($Li_xCoO_2$), a lithium-nickel-cobalt composite oxide ($Li_xNi_{1-y}Co_yO_2$), a spinel type lithium-manganese-nickel composite oxide ($Li_xMn_{2-y}Ni_yO_4$), a lithium-manganese-cobalt composite oxide ($li_xMn_yCo_{1-y}O_2$), a lithium phosphorus oxide ($Li_xFePO_4$), and a lithium-nickel-cobalt-manganese composite oxide. Incidentally, it is desirable for each of the molar ratios x and y to fall within a range of $0 < x \leq 1$, $0 < y \leq 1$.

It is desirable for the lithium-nickel-cobalt-manganese composite oxide to have a composition of $Li_aNi_bCo_cMn_dO_2$ (where the molar ratios a, b, c and d are: $0 \leq a \leq 1.1$, $0.1 \leq b \leq 0.5$, $0 \leq c \leq 0.9$, $0.1 \leq d \leq 0.5$).

Particularly, in the case of using a nonaqueous electrolyte containing an ionic liquid, it is desirable in view of the charge-discharge cycle life of the battery to use the positive electrode active material selected from the group consisting of the lithium iron phosphate, $Li_xVPO_4F$, a lithium-manganese composite oxide, a lithium-nickel composite oxide, and a lithium-nickel-cobalt composite oxide. Since the reactivity between the positive electrode active material exemplified above and the ionic liquid is low, it is possible to obtain a long charge-discharge cycle life of the battery as pointed out above.

Also, the positive electrode active material for the primary battery includes, for example, manganese dioxide, iron oxide, copper oxide, iron sulfide and a fluorocarbon.

It is desirable for the diameters of the primary particles of the positive electrode active material to fall within a range of 100 nm to 1 μm. If the diameter of the primary particle is not smaller than 100 nm, the primary particles can be handled easily in the industrial manufacture of the positive electrode. Also, if the primary particles of the positive electrode active material is not larger than 1 μm, the lithium ions can be diffused smoothly within the positive electrode active material.

It is desirable for the specific surface area of the positive electrode active material to fall within a range of 0.1 $m^2$/g to 10 $m^2$/g. If the specific surface area of the positive electrode active material is not smaller than 0.1 $m^2$/g, it is possible to secure sufficiently the absorption-release sites of the lithium ions. On the other hand, if the specific surface area of the positive electrode active material is not larger than 10 $m^2$/g, the positive electrode active material can be handled easily in the industrial manufacture of the positive electrode. Also, it is possible to secure a good charge-discharge cycle performance of the battery.

The positive electrode conductive agent permits enhancing the current collecting performance and also permits suppressing the contact resistance between the current collector and the active material. The positive electrode conductive agent includes, for example, a carbonaceous material such as acetylene black, carbon black and graphite.

The binder for bonding the positive electrode active material to the positive electrode conductive agent includes, for example, polytetrafluoroethylene (PTFE), polyvinylidene fluoride (PVdF) and a fluorinated rubber.

Concerning the mixing ratio of the positive electrode active material, the positive electrode conductive agent, and the binder, it is desirable for the mixing amount of the positive electrode active material to be not smaller than 80% by weight and not larger than 95% by weight, for the mixing amount of the positive electrode conductive agent to be not smaller than 3% by weight and not larger than 18% by weight, and for the mixing amount of the binder to be not smaller than 2% by weight and not larger than 17% by weight. If the positive electrode conductive agent is mixed in an amount not smaller than 3% by weight, it is possible to obtain the effects described above. On the other hand, if the mixing amount of the positive electrode conductive agent is not larger than 18% by weight, it is possible to suppress the decomposition of the nonaqueous electrolyte on the surface of the positive electrode conductive agent during storage of the nonaqueous electrolyte battery under high temperatures. Further, where the binder is used in an amount not smaller than 2% by weight, it is possible to obtain a sufficient electrode strength. On the other hand, where the mixing amount of the binder is not larger than 17% by weight, it is possible to decrease the mixing amount of the insulator in the electrode to decrease the internal resistance of the nonaqueous electrolyte battery.

The positive electrode can be prepared by, for example, suspending the positive electrode active material, the conductive agent and the binder in an appropriate solvent, followed by coating a current collector with the resultant suspension and subsequently drying and pressing the current collector coated with the suspension. It is also possible to form a mixture of a positive electrode active material, a positive electrode conductive agent and a binder into the shape of pellets. In this case, the pellets thus formed is used for forming the positive electrode layer.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the positive electrode current collector is not larger than 50 μm, the mechanical strength of the aluminum foil or the aluminum alloy foil can be drastically increased to make it possible to press the positive electrode with a high pressure. It follows that the density of the positive electrode can be increased to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

4) Separator

The separator includes, for example, a porous film including polyethylene, polypropylene, cellulose and/or polyvinylidene fluoride (PVdF), and an unwoven fabric made of a synthetic resin. Particularly, it is desirable in view of the improvement in safety to use a porous film made of polyethylene or polypropylene because the particular porous film can be melted under a prescribed temperature to break the current.

5) Case

The case is formed of a laminate film having a thickness of, for example, 0.2 mm or less, or a metal sheet having a thickness of, for example, 0.5 mm or less. It is more desirable for the metal sheet to have a thickness of 0.2 mm or less. Also, the case has a flattened shape, an angular shape, a cylindrical shape, a coin shape, a button shape or a sheet shape, or is of a laminate type. The case includes a case of a large battery mounted to, for example, an electric automobile having two to four wheels in addition to a small battery mounted to a portable electronic device.

The laminate film includes, for example, a multi-layered film including a metal layer and a resin layer covering the metal layer. For decreasing the weight of the battery, it is desirable for the metal layer to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by bonding the periphery of superposed laminate films by the thermal fusion.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 1%. In this case, it is possible to improve the battery in respect of reliability for a long time in a high-temperature environment, and heat dissipating properties.

It is desirable for the metal can formed of aluminum or an aluminum alloy to have an average crystal grain size not larger than 50 μm, more preferably not larger than 30 μm, and furthermore preferably not larger than 5 μm. Where the average crystal grain size is not larger than 50 μm, it is possible to increase drastically the mechanical strength of the metal can formed of aluminum or an aluminum alloy to make it possible to decrease the thickness of the metal can used as the case. As a result, it is possible to realize a battery that is light in weight, high in output, excellent in reliability over a long period, and adapted for mounting on a vehicle.

6) Negative Electrode Terminal

The negative electrode terminal is formed of a material exhibiting an electrical stability and conductivity within the range of 0.4V to 3V of the potential relative to the lithium metal. To be more specific, the material used for forming the negative electrode terminal includes, for example, aluminum and an aluminum alloy containing at least one element selected from the group consisting of Mg, Ti, Zn, Mn, Fe, Cu and Si. In order to lower the contact resistance relative to the negative electrode current collector, it is desirable for the negative electrode terminal to be formed of a material equal to the material used for forming the negative electrode current collector.

7) Positive Electrode Terminal

The positive electrode terminal is formed of a material exhibiting an electrical stability and conductivity within the range of 3V to 5V of the potential relative to the lithium ion metal. To be more specific, the material used for forming the positive electrode terminal includes, for example, aluminum and an aluminum alloy containing at least one element selected from the group consisting of Mg, Ti, Zn, Mn, Fe, Cu and Si. In order to lower the contact resistance relative to the positive electrode current collector, it is desirable for the positive electrode terminal to be formed of a material equal to the material used for forming the positive electrode current collector.

Figure 3:
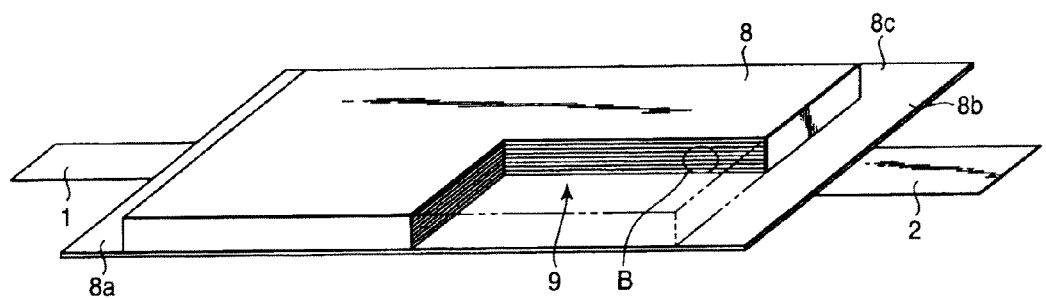
FIG. 3 is an oblique view, partly broken away, schematically showing the construction of another nonaqueous electrolyte battery according to the first embodiment of the present invention.
Figure 4:
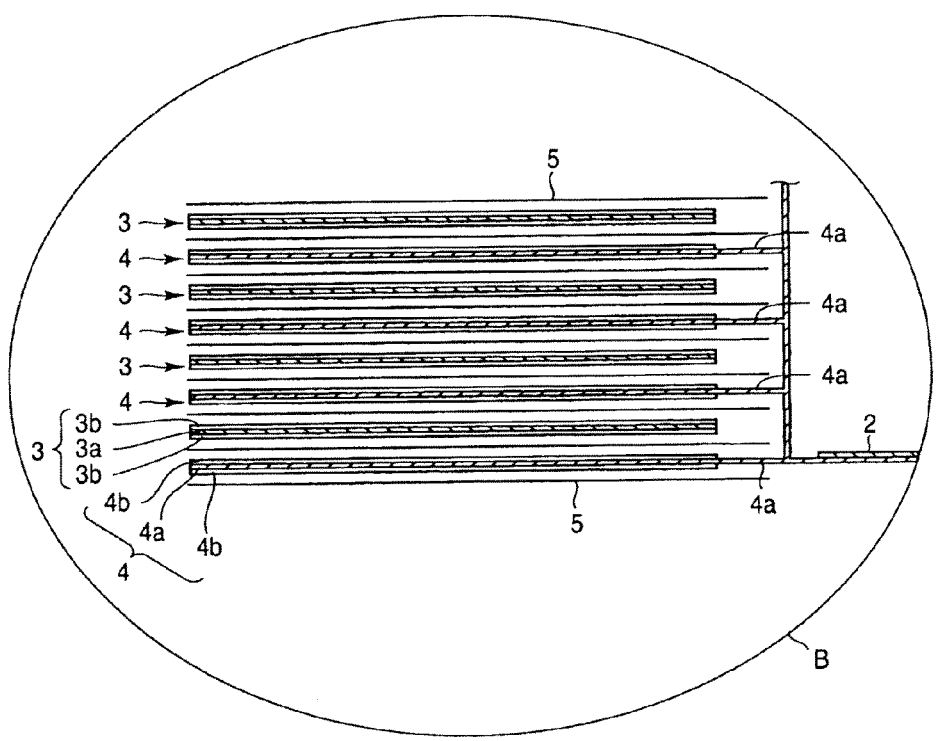
FIG. 4 is a cross sectional view showing in a magnified fashion the construction of region B of the nonaqueous electrolyte battery shown in FIG. 3.

The construction of the nonaqueous electrolyte battery according to the first embodiment of the present invention is not limited to that shown in FIGS. 1 and 2. It is possible for the nonaqueous electrolyte battery according to the first embodiment of the present invention to be constructed as shown in FIGS. 3 and 4. Specifically, FIG. 3 is a cross sectional view, partly broken away, schematically showing the construction of another flat type nonaqueous electrolyte battery according to the first embodiment of the present invention, and FIG. 4 is a cross sectional view showing in a magnified fashion the construction of the circular region B shown in FIG. 3.

As shown in FIG. 3, a laminate type electrode group 9 is housed in a case 8 made of a laminate film. Two short sides and one long side of the case 8 are sealed by the heat seal. The sealed section formed in one of the short sides is called a first sealed section 8a. The sealed section formed in the short side opposite to the first sealed section 8a is called a second sealed section 8b. Further, the sealed section formed on the long side is called a third sealed section 8c. As shown in FIG. 4, the laminate type electrode group 9 is constructed such that a positive electrode 3 and a negative electrode 4 are laminated one upon the other with a separator 5 interposed between the positive electrode 3 and the negative electrode 4. A plurality of positive electrodes 3 are housed in the case 8. Each of these positive electrodes 3 comprises a positive electrode current collector 3a and positive electrode active material-containing layers 3b supported on both surfaces of the positive electrode current collector 3a. Likewise, a plurality of negative electrodes 4 are housed in the case 8. Each of these negative electrodes 4 comprises a negative electrode current collector 4a and negative electrode active material-containing layers 4b formed on both surfaces of the negative electrode current collector 4a. The negative electrode active material-containing layers 4b is porous. The negative electrode current collector 4a included in each negative electrode 4 protrudes at one side from the positive electrode 3. The negative electrode current collector 4a protruding from the positive electrode 3 is electrically connected to a band-like negative electrode terminal 2. The tip portion of the band-like negative electrode terminal 2 is withdrawn to the outside from the second sealed section 8b of the case 8. The positive electrode current collector 3a of the positive electrode 3 protrudes from the negative electrode 4 at the side positioned opposite to the protruding side of the negative electrode current collector 4a, though the protruding side of the positive electrode current collector 3a is not shown in the drawing. The positive electrode current collector 3a protruding from the negative electrode 4 is electrically connected to a band-like positive electrode terminal 1. The tip portion of the band-like positive electrode terminal 1 is positioned on the opposite side of the negative electrode terminal 2 and is withdrawn to the outside from the first sealed section 8a of the case 8.

SECOND EMBODIMENT

A battery pack according to a second embodiment of the present invention comprises a plurality of unit cells each consisting of the nonaqueous electrolyte battery according to the first embodiment of the present invention. The plural unit cells are connected to each other in series or in parallel to form a battery module.

The unit cell (nonaqueous electrolyte battery) according to the first embodiment of the present invention is adapted for preparation of the battery module, and the battery pack according to the second embodiment of the present invention is excellent in the charge-discharge cycle characteristics, as described in the following.

If the impregnation capability of the negative electrode with the nonaqueous electrolyte is improved, it is possible to bring the entire surface of the negative electrode active material into contact with the nonaqueous electrolyte. As a result, the lithium ion concentration within the negative electrode active material tends to be made uniform easily, and, thus, an over-voltage is unlikely to be applied, i.e., a local over-charging and over-discharge is unlikely to be brought about to make uniform the utilization rate of the negative electrode active material. It follows that the differences in the battery capacity and in the impedance among the individual batteries can be made very small. As a result, it is possible to decrease the unevenness in the battery voltage derived from the difference in the battery capacity among the individual batteries in the battery module consisting of a plurality of batteries that are connected in series when the battery module is charged full. It follows that the battery pack according to the second embodiment of the present invention is excellent in the controllability of the battery module voltage, and the charge-discharge cycle characteristics of the battery pack can be improved.

It is possible to use the flat type battery shown in FIG. 1 or FIG. 3 as the unit cell included in the battery module.

Each of a plurality of unit cells 21 included in the battery pack shown in FIG. 5 is formed of a flattened type nonaqueous electrolyte battery constructed as shown in FIG. 1. The plural unit cells 21 are stacked one upon the other in the thickness direction in a manner to align the protruding directions of the positive electrode terminals and the negative electrode terminals. As shown in FIG. 6, the unit cells 21 are connected in series to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 1 and the negative electrode terminals 2. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 6, a wiring 32 is connected to each of the unit cells 21 for detecting the voltage, and the detection signal is transmitted through these wirings 32 to the protective circuit 26. Specifically, the protective circuit 26 is provided with a battery voltage monitoring circuit section. Each of the unit cells 21 is connected to the battery voltage monitoring circuit section via a wiring 32. According to the particular construction, the battery voltage of each of the unit cells 21 can be detected by the protective circuit 26.

Further, in the case shown in FIG. 6, all the unit cells 21 included in the battery module 22 are detected in terms of voltage. Although it is particularly preferable that the voltages of all of the unit cells 21 of the battery module 22 should be detected, it may be sufficient to check the voltages of only some of the unit cells 21.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 5 and 6 are connected in series. However, it is also possible to connect the unit cells 21 in parallel to increase the cell capacity. Of course, it is possible to connect the battery packs in series and in parallel.

Also, the construction of the battery pack can be changed appropriately depending on the use of the battery pack.

It is desirable for the battery pack according to the second embodiment of the present invention to be used in the field requiring high rate charge-discharge cycle characteristics. To be more specific, it is desirable for the battery pack according to the second embodiment of the present invention to be used in, for example, a digital camera as a power supply, or mounted in a vehicle such as a hybrid electric automobile having two to four wheels, an electric automobile having two to four wheels, and or a power-assisted bicycle. Particularly, it is desirable for the battery back of the present invention to be mounted to a vehicle.

Where the nonaqueous electrolyte contains a mixed solvent containing at least two kinds of the compounds selected from the group consisting of propylene carbonate (PC), ethylene carbonate (EC) and γ-butyrolactone (GBL), or where the solvent of the nonaqueous electrolyte contains γ-butyrolactone (GBL), it is desirable for the battery pack of the second embodiment to be used in a field requiring good high temperature characteristics, particularly, to be used in the types of vehicle noted above.

Described in the following are Examples of the present invention. Needless to say, the technical scope of the present invention is not limited to the following Examples, as far as the subject matter of the present invention is not exceeded.

EXAMPLE 1

Preparation of Positive Electrode

In the first step, a slurry was prepared by adding 90% by weight of a lithium-nickel-cobalt-manganese composite oxide ($LiNi_{1/3}CO_{1/3}Mn_{1/3}O_2$) powder used as a positive electrode active material, 5% by weight of acetylene black used as a conductive agent, and 5% by weight of polyvinylidene fluoride (PVdF) to N-methyl pyrrolidone (NMP). Both surfaces of a current collector formed of an aluminum foil having a thickness of 15 μm were coated with the slurry thus prepared, followed by drying and, then, pressing the current collector coated with the slurry to obtain a positive electrode having an electrode density of 3.3 g/cm$^3$.

<Preparation of Negative Electrode>

Prepared as a negative electrode active material was a lithium titanate powder represented by $Li_4Ti_5O_{12}$, and having a spinel structure, an average particle diameter of 0.82 μm, the BET specific surface area, utilizing $N_2$ adsorption, of 10.4 m$^2$/g and 1.55V (vs. Li/Li$^+$) of the Li ion insertion potential.

The measuring methods of the particle diameter and the lithium ion insertion potential of the negative electrode active material will now be described.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

<Lithium Ion Insertion Potential>

The negative electrode was cut into small pieces each sized at 2 cm×2 cm to obtain working electrodes. The working electrode was disposed to face a counter electrode formed of a lithium metal foil sized at 2.2 cm×2.2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolysis solution, which was prepared by dissolving LiBF$_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolysis solution, followed by hermetically closing the glass cell. The glass cell thus manufactured was arranged in a constant temperature bath maintained at 25° C. to measure the lithium ion insertion potential of the working electrode at the time when the glass cell was charged with a current density of 0.1 mA/cm$^2$. Incidentally, a constant temperature bath type No. EC-45 MTP manufactured by Hitachi Ltd. was used as the constant temperature bath.

Prepared was a slurry by adding N-methyl pyrrolidone (NMP) to a mixture consisting of 90% by weight of the negative electrode active material, 5% by weight of coke used as a conductive agent and baked at 1,300° C., which has a lattice spacing $d_{002}$ of 0.3465 nm, an average particle diameter of 8.2 µm, and the BET specific surface area of 11.2 m$^2$/g, and 5% by weight of polyvinylidene fluoride (PVdF) such that the resultant slurry had a solid component ratio of 62%. The slurry thus prepared was kneaded by using a planetary mixer while adding NMP to the slurry to lower gradually the solid component ratio of the slurry, thereby obtaining a slurry having a viscosity of 10.2 cp, which was obtained by the measurement with a B-type viscometer under the condition of 50 rpm. The slurry thus obtained was further mixed by using a bead mill in which zirconia balls each having a diameter of 1 mm were used as the mixing medium.

Both surfaces of a current collector formed of an aluminum foil having a purity of 99.99% and an average crystal grain size of 10 µm, and also having a thickness of 15 µm were coated with the slurry thus obtained, followed by drying the aluminum foil coated with the slurry and, then, subjecting the aluminum foil coated with the slurry to a roll pressing by using a roll heated to 100° C. to obtain a negative electrode having an electrode density and a porosity shown in Table 1. The pore diameter distribution of the negative electrode thus obtained was measured by the mercury porosimetry by the method described in the following. The result of the measurement is shown in Table 4.

The pore diameter distribution of the negative electrode was measured by the mercury porosimetry. Shimadzu Auto pore type 9520 was used as the measuring apparatus. Samples were prepared by cutting the negative electrode into small pieces each sized at about 25×25 mm$^2$, and the samples thus prepared were folded and put in a measuring cell, and the pore diameter distribution of the negative electrode was measured under the condition of the initial pressure of 20 kPa (about 3 psia, corresponding to the pore diameter of about 60 µm). In the data, the specific surface area of the pores was calculated under the assumption that the pore was shaped cylindrical. The diameter of the pore having the highest frequency in the pore diameter distribution was regarded as the mode diameter of the negative electrode. The pore diameter having the highest frequency within the pore diameter range of 0.01 to 0.2 µm was regarded as the mode diameter of the first peak. On the other hand, the pore diameter having the highest frequency within the pore diameter range of 0.003 to 0.02 µm was regarded as the mode diameter of the second peak.

Incidentally, the analytical principle of the mercury porosimetry is based on Washburn's formula (1) given below:

$$D = -4\gamma \cos \theta / P \quad (1)$$

where P denotes the applied pressure, D denotes the diameter of the pore, γ denotes the surface tension of mercury (480 dyne·cm$^{-1}$), and θ denotes the contact angle between mercury and the wall of the pore, which was 140°. Since γ and θ are constants, it is possible to obtain the relationship between the applied pressure P and the pore diameter D from Washburn's formula (1) given above, and the pore diameter and the pore volume distribution can be obtained by measuring the volume of the mercury entering the pores. The details of the measuring method, the principle, etc. are described in, for example, "Biryushi Handbook (Fine Particle Handbook)" by Motoji Jinpo et al., published by Asakura shoten K. K. in 1991 and "Huntaibussei Sokuteihou (Method of Measuring Properties of Powdery Material)" by Sohachiro Hayakawa, published by Asakura shoten K. K. in 1978.

Table 4 shows the pore volume per gram of the negative electrode excluding the negative electrode current collector (entire range of the pore diameter distribution, within pore diameter range of 0.01 to 0.2 µm and within pore diameter range of 0.003 to 0.02 µm), the surface area of the pores in the negative electrode per gram of the negative electrode excluding the negative electrode current collector (entire range of the pore diameter distribution, within pore diameter range of 0.01 to 0.2 µm and within pore diameter range of 0.003 to 0.02 µm), the mode diameters of the first peak and the second peak, and the mode diameter of the negative electrode.

<Preparation of Electrode Group>

A positive electrode, a separator formed of a porous polyethylene film having a thickness of 25 µm, a negative electrode, and another separator equal to that noted above were alternately laminated one upon the other in the order mentioned to obtain a laminate structure, followed by spirally winding the laminate structure thus obtained. Then, the spirally wound laminate structure was subjected to a hot press at 90° C. to obtain an electrode group having a width of 30 mm and a thickness of 3.0 mm. The electrode group thus obtained was housed in a pack formed of a laminate film having a thickness of 0.1 mm and comprising an aluminum foil having a thickness of 40 µm, and polypropylene layers formed on both sides of the aluminum foil, and the electrode group housed in the pack of the laminate film was subjected to a vacuum drying at 80° C. for 24 hours.

<Preparation of Liquid Nonaqueous Electrolyte>

A liquid nonaqueous electrolyte was prepared by dissolving LiBF$_4$ used as an electrolyte in an amount of 1.5 mol/L in a mixed solvent prepared by mixing ethylene carbonate (EC) and γ-butyrolactone (GBL) in a volume ratio of 1:2. The viscosity at 20° C. of the liquid nonaqueous electrolyte thus prepared was found to be 7.1 cp as measured by the B-type viscometer.

After the liquid nonaqueous electrolyte was poured into the laminate film pack housing the electrode group, the pack was perfectly sealed by a heat seal to obtain a nonaqueous electrolyte secondary battery constructed as shown in FIG. 1 and having a width of 35 mm, a thickness of 3.2 mm and a height of 65 mm.

EXAMPLES 2 to 13 and COMPARATIVE EXAMPLE 1

A negative electrode was prepared as in Example 1, except that the diameter of the ball used in the slurry stirring stage and the stirring time were changed as shown in Table 1. Table 1 shows the negative electrode density and the porosity of the negative electrode, and Table 4 shows the pore diameter distribution in the negative electrode. Then, a nonaqueous electrolyte secondary battery was manufactured as in Example 1, except that used was the negative electrode thus obtained and the nonaqueous electrolyte having a composition shown in Table 1.

EXAMPLE 14

A nonaqueous electrolyte secondary battery was manufactured as in Example 13, except that the nonaqueous electrolyte used was formed of an ionic liquid (MEI/Li/BF$_4$) prepared by mixing 1-methyl-3-ethyl imidazolium ion (MEI$^+$), Li$^+$ and BF$_4^-$ in a molar ratio of 40:10:50. The viscosity of the nonaqueous electrolyte at 20° C. was found to be 20 cp.

EXAMPLE 15

A nonaqueous electrolyte secondary battery was manufactured as in Example 14, except that dimethyl ethyl methoxy methyl ammonium ion (hereinafter referred to as ammonium ion) was used in place of 1-methyl-3-ethyl imidazolium ion (MEI$^+$). The viscosity of the nonaqueous electrolyte at 20° C. was found to be 20 cp.

EXAMPLE 16

A nonaqueous electrolyte secondary battery was manufactured as in Example 13, except that lithium-cobalt oxide (LiCoO$_2$) was used as the positive electrode active material.

EXAMPLE 17

A nonaqueous electrolyte secondary battery was manufactured as in Example 13, except that lithium iron phosphate (LiFePO$_4$) was used as the positive electrode active material.

EXAMPLE 18

A liquid nonaqueous electrolyte was prepared by dissolving LiPF$_6$ used as an electrolyte in an amount of 1 mol/L in a mixed solvent prepared by mixing ethylene carbonate (EC) and diethyl carbonate (DEC) in a volume ratio of 1:2. The viscosity at 20° C. of the liquid nonaqueous electrolyte thus prepared was found to be 1.9 cp. Then, a nonaqueous electrolyte secondary battery was manufactured as in Example 13, except that used was the liquid nonaqueous electrolyte thus prepared.

EXAMPLES 19 and 20

A negative electrode was prepared as in Example 1, except that used as the negative electrode active material was a lithium titanate powder represented by the chemical formula of Li$_4$Ti$_5$O$_{12}$, having a spinel structure, and also having the average particle diameter and the BET specific surface area utilizing the N$_2$ absorption, which are shown in Table 2, and having a Li ion insertion potential of 1.55V (vs. Li/Li$^+$). Table 2 shows the density and the porosity of the negative electrode thus obtained, and Table 5 shows the pore diameter distribution in the negative electrode thus prepared. Then, a nonaqueous electrolyte secondary battery was manufactured as in Example 1, except that used was the negative electrode thus prepared.

COMPARATIVE EXAMPLE 2

A negative electrode was prepared as in Example 1, except that used as the negative electrode active material was a lithium titanate powder represented by the chemical formula of Li$_4$Ti$_5$O$_{12}$, having a spinel structure, having the average particle diameter and the BET specific surface area utilizing the N$_2$ absorption, which are shown in Table 2, and also having a Li ion insertion potential of 1.55V (vs. Li/Li$^+$). Table 2 shows the density and the porosity of the negative electrode thus obtained, and Table 5 shows the pore diameter distribution in the negative electrode thus prepared. Then, a nonaqueous electrolyte secondary battery was manufactured as in Example 1, except that used was the negative electrode thus prepared.

EXAMPLE 21

A negative electrode was prepared as in Example 1, except that used as the negative electrode active material was an FeS powder having the average particle diameter and the BET specific surface area utilizing the N$_2$ absorption, which are shown in Table 2, and having a Li ion insertion potential of 1.8V (vs. Li/Li$^+$). Table 2 shows the density and the porosity of the negative electrode thus obtained, and Table 5 shows the pore diameter distribution in the negative electrode thus prepared. Then, a nonaqueous electrolyte secondary battery was manufactured as in Example 1, except that used was the negative electrode thus prepared.

EXAMPLE 22

A negative electrode was prepared as in Example 1, except that used as the negative electrode active material was a lithium titanate powder represented by the chemical formula of Li$_2$Ti$_3$O$_7$, having the average particle diameter and the BET specific surface area utilizing the N$_2$ absorption, which are shown in Table 2, and having a Li ion insertion potential of 1 to 2V (vs. Li/Li$^+$). Table 2 shows the density and the porosity of the negative electrode thus obtained, and Table 5 shows the pore diameter distribution in the negative electrode thus prepared. Then, a nonaqueous electrolyte secondary battery was manufactured as in Example 1, except that used was the negative electrode thus prepared.

EXAMPLES 23 and 24

A negative electrode was prepared as in Example 1, except that used as the negative electrode active material was a titanium-containing metal composite oxide containing a microcrystalline phase of TiO$_2$ and a non-crystalline phase (an amorphous phase) of TiO$_2$. The titanium-containing metal composite oxide was represented by TiO$_2$—P$_2$O$_5$—SnO$_2$—NiO—CuO, had the average particle diameter and the BET specific surface area utilizing the N$_2$ absorption, which are shown in Table 2, and also had a Li ion insertion potential of 1 to 2V (vs. Li/Li$^+$). Table 2 shows the density and the porosity of the negative electrode thus obtained, and Table 5 shows the pore diameter distribution in the negative electrode thus prepared. Then, a nonaqueous electrolyte secondary battery was manufactured as in Example 1, except that used was the negative electrode thus prepared.

COMPARATIVE EXAMPLE 3

Prepared as the negative electrode active material was a titanium-containing metal composite oxide containing a microcrystalline phase of TiO$_2$ and a non-crystalline phase. The titanium-containing metal composite oxide was represented by TiO$_2$—P$_2$O$_5$—SnO$_2$—NiO—CuO, had the average particle diameter and the BET specific surface area utilizing the N$_2$ absorption, which are shown in Table 2, and also had a Li ion insertion potential of 1 to 2V (vs. Li/Li$^+$).

The total amount of N-methylpyrrolidone (NMP) was added to a mixture consisting of 90% by weight of the negative electrode active material noted above, 5% by weight of the conductive agent equal to that used in Example 1 and 5% by weight of polyvinylidene fluoride (PVdF). The resultant mixture was kneaded by using a planetary mixer to prepare a slurry. Then, both surfaces of a current collector similar to that used in Example 1 were coated with the slurry thus obtained, followed by drying and, then, subjecting the current collector coated with the slurry to a roll press to obtain a negative electrode. Table 2 shows the density and the porosity of the negative electrode thus prepared, and Table 5 shows the pore diameter distribution in the negative electrode. A nonaqueous electrolyte secondary battery was manufactured as in Example 1, except that used was the negative electrode thus obtained.

COMPARATIVE EXAMPLE 4

Prepared as the negative electrode active material was a graphite having the average particle diameter and the BET specific surface area, determined by $N_2$ adsorption, as shown in Table 2, and also having a Li ion insertion potential of 0.15V (vs. Li/Li$^+$).

The total amount of N-methylpyrrolidone (NMP) was added to a mixture consisting of 90% by weight of the negative electrode active material noted above, 5% by weight of the conductive agent equal to that used in Example 1 and 5% by weight of polyvinylidene fluoride (PVdF). The resultant mixture was kneaded by using a planetary mixer to prepare a slurry. Then, both surfaces of a current collector formed of a copper foil having a thickness of 12 µm were coated with the slurry thus obtained, followed by drying and, then, subjecting the current collector coated with the slurry to a roll press to obtain a negative electrode. Table 2 shows the density and the porosity of the negative electrode thus prepared, and Table 5 shows the pore diameter distribution in the negative electrode. Then, a nonaqueous electrolyte secondary battery was manufactured as in Example 1, except that used was the negative electrode thus obtained.

EXAMPLES 25 to 31

A negative electrode was prepared as in Example 1, except that the diameter of the ball used in the stirring stage for preparing the slurry and the stirring time were changed as shown in Table 3. Table 3 also shows the density and the porosity of the negative electrode, and Table 6 shows the pore diameter distribution in the negative electrode. Then, a nonaqueous electrolyte secondary battery was manufactured as in Example 1, except that used was the negative electrode thus prepared.

COMPARATIVE EXAMPLE 5

Prepared as a negative electrode active material was graphite having an average particle diameter and a BET specific surface area, determined by $N_2$ adsorption, as shown in Table 3, and also having a Li ion insertion potential of 0.15V (vs. Li/Li$^+$). Then, a negative electrode was manufactured as in Example 1, except that the graphite thus prepared was used as the negative electrode active material, and that a copper foil having a thickness of 12 µm was used as a current collector. Table 3 shows the density and the porosity of the negative electrode thus manufactured, and Table 6 shows the pore diameter distribution in the negative electrode. Further, a nonaqueous electrolyte secondary battery was manufactured as in Example 1, except that used was the negative electrode thus obtained.

The nonaqueous electrolyte secondary battery manufactured in each of the Examples and the Comparative Examples excluding Comparative Examples 4 and 5 was charged for one hour under an environment of 25° C. and under a constant voltage of 2.8V, followed by discharging the nonaqueous electrolyte secondary battery under a low current of 0.2 A to measure the discharge capacity of 0.2 A. Also, after charged under the same conditions, the nonaqueous electrolyte secondary battery was discharged under a high current of 2 A to measure the discharge capacity of 2 A. A ratio of the 2 A discharge capacity to the 0.2 A discharge capacity was obtained from the experimental data thus obtained. Further, a charge-discharge cycle test was conducted by repeatedly charging-discharging the nonaqueous electrolyte secondary battery such that the secondary battery was charged under the conditions given above, followed by discharging the secondary battery under a current of 600 mA until the battery voltage was lowered to 1.5V. The number of charge-discharge cycles that were performed before the battery capacity was lowered to 80% of the initial capacity was measured to determine the charge-discharge cycle life. Tables 4 to 6 show the experimental data.

The nonaqueous electrolyte secondary battery manufactured in each of Comparative Examples 4 and 5 was charged for one hour under an environment of 25° C. and under a constant voltage of 4.2V, followed by discharging the secondary battery under a low current of 0.2 A to obtain a discharge capacity of 0.2 A. Also, after charged under the same conditions, the nonaqueous electrolyte secondary battery was discharged under a high current of 2 A to measure the discharge capacity of 2 A. A ratio of the 2 A discharge capacity to the 0.2 A discharge capacity was obtained from the experimental data thus obtained. Further, a charge-discharge cycle test was conducted by repeatedly charging-discharging the nonaqueous electrolyte secondary battery such that the secondary battery was charged under the conditions given above, followed by discharging the secondary battery under a current of 600 mA until the battery voltage was lowered to 1.5V. The number of charge-discharge cycles that were performed before the battery capacity was lowered to 80% of the initial capacity was measured to determine the charge-discharge cycle life. Tables 5 and 6 show the experimental data.

TABLE 1

| | Positive electrode active material | Nonaqueous electrolyte | Negative electrode active material | Average particle diameter of negative electrode active material (µm) | Specific surface area of negative electrode active material (m$^2$/g) |
|---|---|---|---|---|---|
| Comparative Example 1 | LiNi$_{1/3}$Co$_{1/3}$Mn$_{1/3}$O$_2$ | 1.5M LiBF$_4$-EC/GBL(1:1) | Li$_4$Ti$_5$O$_{12}$ | 5.84 | 2.1 |
| Example 1 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 2 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 3 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |

TABLE 1-continued

| | | | | | |
|---|---|---|---|---|---|
| Example 4 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 5 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 6 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 7 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 8 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 9 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 10 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 11 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 12 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.82 | 10.4 |
| Example 13 | LiNi$_{1/3}$Co$_{1/3}$Mn$_{1/3}$O$_2$ | 1.5M LiBF4-EC/GBL(1:2) | Li$_4$Ti$_5$O$_{12}$ | 0.82 | 10.4 |

| | Density of negative electrode (g/cm$^3$) | Porosity of negative electrode (%) | Ball diameter (mm) | Stirring Time (minutes) |
|---|---|---|---|---|
| Comparative Example 1 | 2.2 | 25.6 | 1 | 30 |
| Example 1 | 2.4 | 32.1 | 1 | 10 |
| Example 2 | 2.4 | 33.5 | 1 | 30 |
| Example 3 | 2.4 | 33.6 | 1 | 30 |
| Example 4 | 2.4 | 32.2 | 1 | 30 |
| Example 5 | 2.4 | 31.9 | 1 | 30 |
| Example 6 | 2.4 | 31.1 | 1 | 30 |
| Example 7 | 2.4 | 32.8 | 1 | 30 |
| Example 8 | 2.4 | 34.7 | 1 | 30 |
| Example 9 | 2.4 | 33.3 | 1 | 30 |
| Example 10 | 2.4 | 32.9 | 1 | 30 |
| Example 11 | 2.4 | 34.7 | 1 | 30 |
| Example 12 | 2.4 | 33.4 | 1 | 30 |
| Example 13 | 2.4 | 32.0 | 1 | 30 |

TABLE 2

| | Positive electrode active material | Nonaqueous electrolyte | Negative electrode active material | Average particle diameter of negative electrode active material (μm) | Specific surface area of negative electrode active material (m$^2$/g) |
|---|---|---|---|---|---|
| Example 14 | LiNi$_{1/3}$Co$_{1/3}$Mn$_{1/3}$O$_2$ | MEI/Li/BF$_4$ | Li$_4$Ti$_5$O$_{12}$ | 0.82 | 10.4 |
| Example 15 | LiNi$_{1/3}$Co$_{1/3}$Mn$_{1/3}$O$_2$ | ammonium ion/Li/BF$_4$ | Li$_4$Ti$_5$O$_{12}$ | 0.82 | 10.4 |
| Example 16 | LiCoO$_2$ | 1.5M LiBF$_4$-EC/GBL(1:2) | Li$_4$Ti$_5$O$_{12}$ | 0.82 | 10.4 |
| Example 17 | LiFePO$_4$ | 1.5M LiBF$_4$-EC/GBL(1:2) | Li$_4$Ti$_5$O$_{12}$ | 0.82 | 10.4 |
| Example 18 | LiNi$_{1/3}$Co$_{1/3}$Mn$_{1/3}$O$_2$ | 1M LiPF$_6$-EC/DEC(1:2) | Li$_4$Ti$_5$O$_{12}$ | 0.82 | 10.4 |
| Example 19 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.62 | 21.6 |
| Example 20 | LiNi$_{1/3}$Co$_{1/3}$Mn$_{1/3}$O$_2$ | 1.5M LiBF$_4$-EC/GBL(1:2) | Li$_4$Ti$_5$O$_{12}$ | 0.41 | 35.2 |
| Comparative Example 2 | LiNi$_{1/3}$Co$_{1/3}$Mn$_{1/3}$O$_2$ | 1.5M LiBF$_4$-EC/GBL(1:3) | La$_4$Ti$_5$O$_{12}$ | 0.02 | 70.4 |
| Example 21 | LiNi$_{1/3}$Co$_{1/3}$Mn$_{1/3}$O$_2$ | 1.5M LiBF$_4$-EC/GBL(1:2) | FeS | 0.9 | 8.0 |
| Example 22 | LiNi$_{1/3}$Co$_{1/3}$Mn$_{1/3}$O$_2$ | 1.5M LiBF$_4$-EC/GBL(1:2) | Li$_2$Ti$_3$O$_7$ | 0.92 | 5.4 |
| Example 23 | LiNi$_{1/3}$Co$_{1/3}$Mn$_{1/3}$O$_2$ | 1.5M LiBF$_4$-EC/GBL(1:2) | TiO$_2$based | 0.22 | 48.9 |
| Example 24 | LiNi$_{1/3}$Co$_{1/3}$Mn$_{1/3}$O$_2$ | 1.5M LiBF$_4$-EC/GBL(1:2) | TiO$_2$based | 0.12 | 50.0 |
| Comparative Example 3 | LiNi$_{1/3}$Co$_{1/3}$Mn$_{1/3}$O$_2$ | 1.5M LiBF$_4$-EC/GBL(1:3) | TiO$_2$based | 0.12 | 50.0 |
| Comparative Example 4 | LiNi$_{1/3}$Co$_{1/3}$Mn$_{1/3}$O$_2$ | 1.5M LiBF$_4$-EC/GBL(1:2) | Graphite | 3.4 | 20.0 |

TABLE 2-continued

|  | Density of negative electrode (g/cm³) | Porosity of negative electrode (%) | Ball diameter (mm) | Stirring Time (minutes) |
|---|---|---|---|---|
| Example 14 | 2.4 | 32.0 | 1 | 30 |
| Example 15 | 2.4 | 32.0 | 1 | 30 |
| Example 16 | 2.4 | 32.0 | 1 | 30 |
| Example 17 | 2.4 | 32.0 | 1 | 30 |
| Example 18 | 2.4 | 32.0 | 1 | 30 |
| Example 19 | 2.3 | 37.4 | 1 | 30 |
| Example 20 | 2.2 | 39.6 | 1 | 30 |
| Comparative Example 2 | 1.6 | 44.0 | 1 | 30 |
| Example 21 | 3.6 | 32.0 | 1 | 30 |
| Example 22 | 2.4 | 33.4 | 1 | 30 |
| Example 23 | 2 | 39.8 | 1 | 30 |
| Example 24 | 1.8 | 39.8 | 1 | 30 |
| Comparative Example 3 | 1.6 | 42.1 | 1 | 30 |
| Comparative Example 4 | 1.4 | 32.0 | 1 | 30 |

TABLE 3

|  | Positive electrode active material | Nonaqueous electrolyte | Negative electrode active material | Average particle diameter of negative electrode active material (μm) | Specific surface area of negative electrode active material (m²/g) |
|---|---|---|---|---|---|
| Example 25 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 26 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 27 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 28 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 29 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 30 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Example 31 | $LiNi_{1/3}Co_{1/3}Mn_{1/3}O_2$ | 1.5M $LiBF_4$ - EC/GBL(1:2) | $Li_4Ti_5O_{12}$ | 0.82 | 10.4 |
| Comparative Example 5 | $LiNi_{1/3}Co_{1/3}Mn_{1/3}O_2$ | 1.5M $LiBF_4$ - EC/GBL(1:2) | Graphite | 0.83 | 10.1 |

|  | Density of negative electrode (g/cm³) | Porosity of negative electrode (%) | Ball diameter (mm) | Stirring Time (minutes) |
|---|---|---|---|---|
| Example 25 | 2.2 | 40.1 | 5 | 30 |
| Example 26 | 2.4 | 32.0 | 1 | 10 |
| Example 27 | 2.4 | 31.9 | 5 | 10 |
| Example 28 | 2.4 | 32.0 | 0.5 | 30 |
| Example 29 | 2.3 | 37.1 | 3 | 60 |
| Example 30 | 2.2 | 39.8 | 1 | 5 |
| Example 31 | 2.0 | 41.2 | 3 | 60 |
| Comparative Example 5 | 1.3 | 31.9 | 1 | 30 |

TABLE 4

|  |  |  |  |  | [0.01~0.2 μm] | | |
|---|---|---|---|---|---|---|---|
|  | Specific pore volume in negative electrode (mL/g) | Specific pore surface area in negative electrode (m²/g) | Mode diameter of negative electrode (μm) | The number of peaks | Specific pore volume in negative electrode (mL/g) | Specific pore surface area in negative electrode (m²/g) | Mode diameter of negative electrode (μm) |
| Comparative Example 1 | 0.0972 | 2.08 | 0.265 | 1 | 0.0803 | 2.01 | 0.265 |
| Example 1 | 0.1474 | 6.12 | 0.155 | 2 | 0.1012 | 6.04 | 0.155 |
| Example 2 | 0.2880 | 8.10 | 0.105 | 2 | 0.1670 | 7.85 | 0.105 |
| Example 3 | 0.2668 | 7.23 | 0.095 | 2 | 0.1422 | 7.13 | 0.095 |
| Example 4 | 0.2597 | 7.17 | 0.092 | 2 | 0.1401 | 7.11 | 0.092 |

TABLE 4-continued

| | | | | | | | |
|---|---|---|---|---|---|---|---|
| Example 5 | 0.2527 | 7.47 | 0.093 | 2 | 0.1409 | 7.17 | 0.093 |
| Example 6 | 0.2600 | 7.27 | 0.097 | 2 | 0.1451 | 7.04 | 0.097 |
| Example 7 | 0.2547 | 7.33 | 0.096 | 2 | 0.1361 | 7.14 | 0.096 |
| Example 8 | 0.2830 | 8.24 | 0.091 | 2 | 0.1469 | 8.06 | 0.091 |
| Example 9 | 0.2833 | 8.06 | 0.090 | 2 | 0.1383 | 7.90 | 0.090 |
| Example 10 | 0.2632 | 7.86 | 0.097 | 2 | 0.1425 | 7.71 | 0.097 |
| Example 11 | 0.2830 | 7.70 | 0.097 | 2 | 0.1401 | 7.40 | 0.097 |
| Example 12 | 0.2731 | 8.00 | 0.088 | 2 | 0.1311 | 7.71 | 0.088 |
| Example 13 | 0.2586 | 7.77 | 0.096 | 2 | 0.1393 | 7.58 | 0.096 |

| | [0.003~0.02 μm] | | | | | |
|---|---|---|---|---|---|---|
| | Specific pore volume in negative electrode (mL/g) | Specific pore surface area in negative electrode (m$^2$/g) | Mode diameter of negative electrode (μm) | 0.2 A discharge capacity (mAh) | Capacity retention ratio during 2 A discharge capacity operation (%) | Cycle life (the number of charge-discharge operations) |
| Comparative Example 1 | — | — | — | 580 | 32 | 250 |
| Example 1 | 0.0001 | 0.10 | 0.0081 | 590 | 90 | 600 |
| Example 2 | 0.0005 | 0.26 | 0.0086 | 600 | 91 | 610 |
| Example 3 | 0.0002 | 0.13 | 0.0085 | 600 | 90 | 630 |
| Example 4 | 0.0003 | 0.06 | 0.0083 | 600 | 92 | 580 |
| Example 5 | 0.0006 | 0.30 | 0.0094 | 600 | 91 | 600 |
| Example 6 | 0.0005 | 0.23 | 0.0075 | 600 | 90 | 600 |
| Example 7 | 0.0003 | 0.17 | 0.0084 | 600 | 91 | 590 |
| Example 8 | 0.0003 | 0.14 | 0.0084 | 600 | 92 | 600 |
| Example 9 | 0.0003 | 0.13 | 0.0084 | 600 | 91 | 620 |
| Example 10 | 0.0002 | 0.13 | 0.0085 | 600 | 90 | 610 |
| Example 11 | 0.0006 | 0.27 | 0.0100 | 600 | 90 | 590 |
| Example 12 | 0.0006 | 0.27 | 0.0100 | 600 | 90 | 600 |
| Example 13 | 0.0005 | 0.19 | 0.0098 | 600 | 91 | 610 |

TABLE 5

| | | | | | [0.01~0.2 μm] | | |
|---|---|---|---|---|---|---|---|
| | Specific pore volume in negative electrode (mL/g) | Specific pore surface area in negative electrode (m$^2$/g) | Mode diameter of negative electrode (μm) | The number of peaks | Specific pore volume in negative electrode (mL/g) | Specific pore surface area in negative electrode (m$^2$/g) | Mode diameter of negative electrode (μm) |
| Example 14 | 0.2586 | 7.77 | 0.096 | 2 | 0.1393 | 7.58 | 0.096 |
| Example 15 | 0.2586 | 7.77 | 0.096 | 2 | 0.1393 | 7.58 | 0.096 |
| Example 16 | 0.2586 | 7.77 | 0.096 | 2 | 0.1393 | 7.58 | 0.096 |
| Example 17 | 0.2586 | 7.77 | 0.096 | 2 | 0.1393 | 7.58 | 0.096 |
| Example 18 | 0.2586 | 7.77 | 0.096 | 2 | 0.1393 | 7.58 | 0.096 |
| Example 19 | 0.3374 | 16.87 | 0.050 | 2 | 0.1650 | 15.93 | 0.051 |
| Example 20 | 0.3921 | 26.84 | 0.018 | 2 | 0.1803 | 25.46 | 0.020 |
| Comparative Example 2 | 1.2211 | 60.12 | 0.009 | 1 | — | — | — |
| Example 21 | 0.2190 | 5.98 | 0.130 | 2 | 0.1129 | 5.74 | 0.130 |
| Example 22 | 0.2010 | 6.24 | 0.113 | 2 | 0.1087 | 6.08 | 0.113 |
| Example 23 | 0.4973 | 37.90 | 0.011 | 2 | 0.2347 | 35.86 | 0.013 |
| Example 24 | 0.6218 | 39.11 | 0.010 | 2 | 0.3425 | 37.01 | 0.011 |
| Comparative Example 3 | 1.0284 | 44.24 | 0.010 | 1 | — | — | — |
| Comparative Example 4 | 0.2580 | 7.62 | 0.100 | 1 | 0.1274 | 7.60 | 0.098 |

| | [0.003~0.02 μm] | | | | | |
|---|---|---|---|---|---|---|
| | Specific pore volume in negative electrode (mL/g) | Specific pore surface area in negative electrode (m$^2$/g) | Mode diameter of negative electrode (μm) | 0.2 A discharge capacity (mAh) | Capacity retention ratio during 2 A discharge capacity operation (%) | Cycle life (the number of charge-discharge operations) |
| Example 14 | 0.0005 | 0.19 | 0.0098 | 600 | 78 | 450 |
| Example 15 | 0.0005 | 0.19 | 0.0098 | 600 | 82 | 500 |
| Example 16 | 0.0005 | 0.19 | 0.0098 | 600 | 92 | 600 |
| Example 17 | 0.0005 | 0.19 | 0.0098 | 600 | 80 | 800 |
| Example 18 | 0.0005 | 0.19 | 0.0098 | 600 | 80 | 600 |
| Example 19 | 0.0021 | 0.91 | 0.0100 | 600 | 94 | 650 |
| Example 20 | 0.0084 | 1.22 | 0.0100 | 600 | 96 | 700 |
| Comparative Example 2 | — | — | — | 550 | 44 | 200 |
| Example 21 | 0.0005 | 0.23 | 0.0085 | 800 | 88 | 450 |

TABLE 5-continued

| | | | | | | |
|---|---|---|---|---|---|---|
| Example 22 | 0.0006 | 0.16 | 0.0081 | 600 | 84 | 500 |
| Example 23 | 0.0100 | 1.91 | 0.0100 | 700 | 92 | 480 |
| Example 24 | 0.0160 | 2.43 | 0.0130 | 680 | 90 | 400 |
| Comparative Example 3 | — | — | — | 600 | 38 | 150 |
| Comparative Example 4 | — | — | — | 600 | 85 | 20 |

TABLE 6

| | Specific pore volume in negative electrode (mL/g) | Specific pore surface area in negative electrode (m²/g) | Mode diameter of negative electrode (μm) | The number of peaks | [0.01~0.2 μm] | | |
|---|---|---|---|---|---|---|---|
| | | | | | Specific pore volume in negative electrode (mL/g) | Specific pore surface area in negative electrode (m²/g) | Mode diameter of negative electrode (μm) |
| Example 25 | 0.4940 | 60.3 | 0.059 | 2 | 0.4705 | 48.9 | 0.059 |
| Example 26 | 0.1384 | 6.10 | 0.169 | 2 | 0.1010 | 6.00 | 0.169 |
| Example 27 | 0.3200 | 12.7 | 0.062 | 2 | 0.2625 | 10.84 | 0.062 |
| Example 28 | 0.0598 | 6.33 | 0.174 | 2 | 0.05 | 6.21 | 0.194 |
| Example 29 | 0.5981 | 52.0 | 0.054 | 2 | 0.5 | 49.1 | 0.054 |
| Example 30 | 0.1073 | 5.20 | 0.170 | 2 | 0.0903 | 5 | 0.170 |
| Example 31 | 1.0121 | 49.8 | 0.082 | 2 | 0.4683 | 47.0 | 0.060 |
| Comparative Example 5 | 0.1424 | 6.10 | 0.153 | 2 | 0.1010 | 6.03 | 0.153 |

| | [0.003~0.02 μm] | | | | | |
|---|---|---|---|---|---|---|
| | Specific pore volume in negative electrode (mL/g) | Specific pore surface area in negative electrode (m²/g) | Mode diameter of negative electrode (μm) | 0.2 A discharge capacity (mAh) | Capacity retention ratio during 2 A discharge capacity operation (%) | Cycle life (the number of charge-discharge operations) |
| Example 25 | 0.02 | 10 | 0.018 | 600 | 91 | 550 |
| Example 26 | 0.0001 | 0.10 | 0.003 | 590 | 87 | 600 |
| Example 27 | 0.0180 | 1.86 | 0.02 | 600 | 91 | 560 |
| Example 28 | 0.0001 | 0.10 | 0.0080 | 590 | 84 | 600 |
| Example 29 | 0.02 | 2.73 | 0.019 | 600 | 91 | 570 |
| Example 30 | 0.0001 | 0.10 | 0.003 | 590 | 85 | 600 |
| Example 31 | 0.017 | 2.21 | 0.016 | 600 | 90 | 590 |
| Comparative Example 5 | 0.0001 | 0.10 | 0.0081 | 590 | 65 | 15 |

As apparent from the experimental data given in Tables 1 to 6, the nonaqueous electrolyte secondary battery for each of Examples 1 to 31 was found to be superior to that for each of Comparative Examples 1 to 5 in charge-discharge cycle characteristics.

Concerning the specific volume of the first pores having a diameter of 0.01 to 0.2 μm, the experimental data for Examples 1, 28 and 29 indicate that the nonaqueous electrolyte secondary battery is excellent in both the high rate discharge characteristics and the charge-discharge cycle characteristics in the case where the specific volume of the first pores formed in the negative electrode falls within a range of 0.05 to 0.5 mL/g.

When it comes to the specific surface area of the first pores having a diameter of 0.01 to 0.2 μm, the experimental data for Examples 1, 25 and 30 indicate that the nonaqueous electrolyte secondary battery is excellent in both the high rate discharge characteristics and the charge-discharge cycle characteristics in the case where the specific surface area of the pores formed in the negative electrode falls within a range of 5 to 50 m²/g.

When it comes to the mode diameter of the first peak, it can be understood by the comparison among Examples 1, 2, 20, 23 and 28 that the nonaqueous electrolyte secondary battery is excellent in both the high rate discharge characteristics and the charge-discharge cycle characteristics in the case where the mode diameter of the first peak falls within a range of 0.01 to 0.2 μm. Particularly, the experimental data support that excellent charge-discharge cycle characteristics can be obtained in the case where the mode diameter of the first peak falls within a range of 0.02 to 0.1 μm as in Examples 2 and 20.

Concerning the specific volume of the second pores having a diameter of 0.003 to 0.02 μm, the experimental data for Examples 1 and 25 indicate that the nonaqueous electrolyte secondary battery is excellent in both the high rate discharge characteristics and the charge-discharge cycle characteristics in the case where the specific volume of the second pores formed in the negative electrode falls within a range of 0.0001 to 0.02 mL/g.

When it comes to the specific surface area of the second pores having a diameter of 0.003 to 0.02 μm, the experimental data for Examples 1 and 25 indicate that the nonaqueous electrolyte secondary battery is excellent in both the high rate discharge characteristics and the charge-discharge cycle characteristics in the case where the specific surface area of the second pores formed in the negative electrode falls within a range of 0.1 to 10 m²/g.

Further, when it comes to the mode diameter of the second peak, it can be understood by the comparison among Examples 1, 26, and 27 that the nonaqueous electrolyte secondary battery is excellent in both the high rate discharge characteristics and the charge-discharge cycle characteristics in the case where the mode diameter of the second peak falls within a range of 0.003 to 0.02 µm.

Concerning the kind of the negative electrode active material, it has been clarified by the comparison among Examples 1, 21, 22 and 23 that the nonaqueous electrolyte secondary battery for each of Examples 1, 22 and 23 using a titanium-containing composite oxide as the negative electrode active material was superior in the charge-discharge cycle characteristics to the nonaqueous electrolyte secondary battery for Example 21 using an iron-based sulfide as the negative electrode active material. It should be noted in particular that the nonaqueous electrolyte secondary battery for each of Examples 1 and 22 using a lithium-titanium oxide as the negative electrode active material was found to be particularly excellent in the charge-discharge cycle characteristics.

Concerning the kind of the positive electrode active material, the experimental data for Examples 13, 16 and 17 indicate that the nonaqueous electrolyte secondary battery for each of these Examples was excellent in both the high rate discharge characteristics and the charge-discharge cycle characteristics. In the nonaqueous electrolyte secondary battery for Example 13, a lithium-nickel-cobalt-manganese composite oxide was used as the positive electrode active material, and in the nonaqueous electrolyte secondary battery for Example 16, a lithium-cobalt composite oxide was used as the positive electrode active material. It was possible to obtain particularly excellent high rate discharge characteristics in the nonaqueous electrolyte secondary battery for each of these Examples 13 and 16. On the other hand, the nonaqueous electrolyte secondary battery for Example 17, in which a lithium-phosphorus oxide having an olivine structure was used as the positive electrode active material, was found to be advantageous in terms of the charge-discharge cycle characteristics.

Regarding the kind of the nonaqueous electrolyte, it has been clarified by the comparison among Examples 13, 14, 15 and 18 that the nonaqueous electrolyte secondary battery for each of Examples 13 and 18 in which nonaqueous electrolyte used contained an organic solvent, is superior in the charge-discharge cycle characteristics to the nonaqueous electrolyte secondary battery for each of Examples 14 and 15, in which the nonaqueous electrolyte used contained an ionic liquid. In particular, the secondary battery for Example 13 in which the nonaqueous electrolyte used contained GBL was found to be superior in both the high rate discharge characteristics and the charge-discharge cycle characteristics to the secondary battery for Example 18.

A negative electrode active material exhibiting a Li ion insertion potential lower than 0.4V (vs. Li/Li$^+$) was used in the battery for each of Comparative Examples 4 and 5. The negative electrode used in the battery for Comparative Example 4 exhibited a pore diameter distribution that did not have a second peak. As a result, the battery for Comparative Example 4 was found to have a charge-discharge cycle life that was markedly shorter than that for each of Examples 1 to 31. The negative electrode used in the battery for Comparative Example 5 certainly exhibited the pore diameter distribution substantially equal to that for Example 1. However, the battery for Comparative Example 5 was found to be inferior in both the high rate discharge characteristics and the charged-discharge cycle life.

Figure 7:
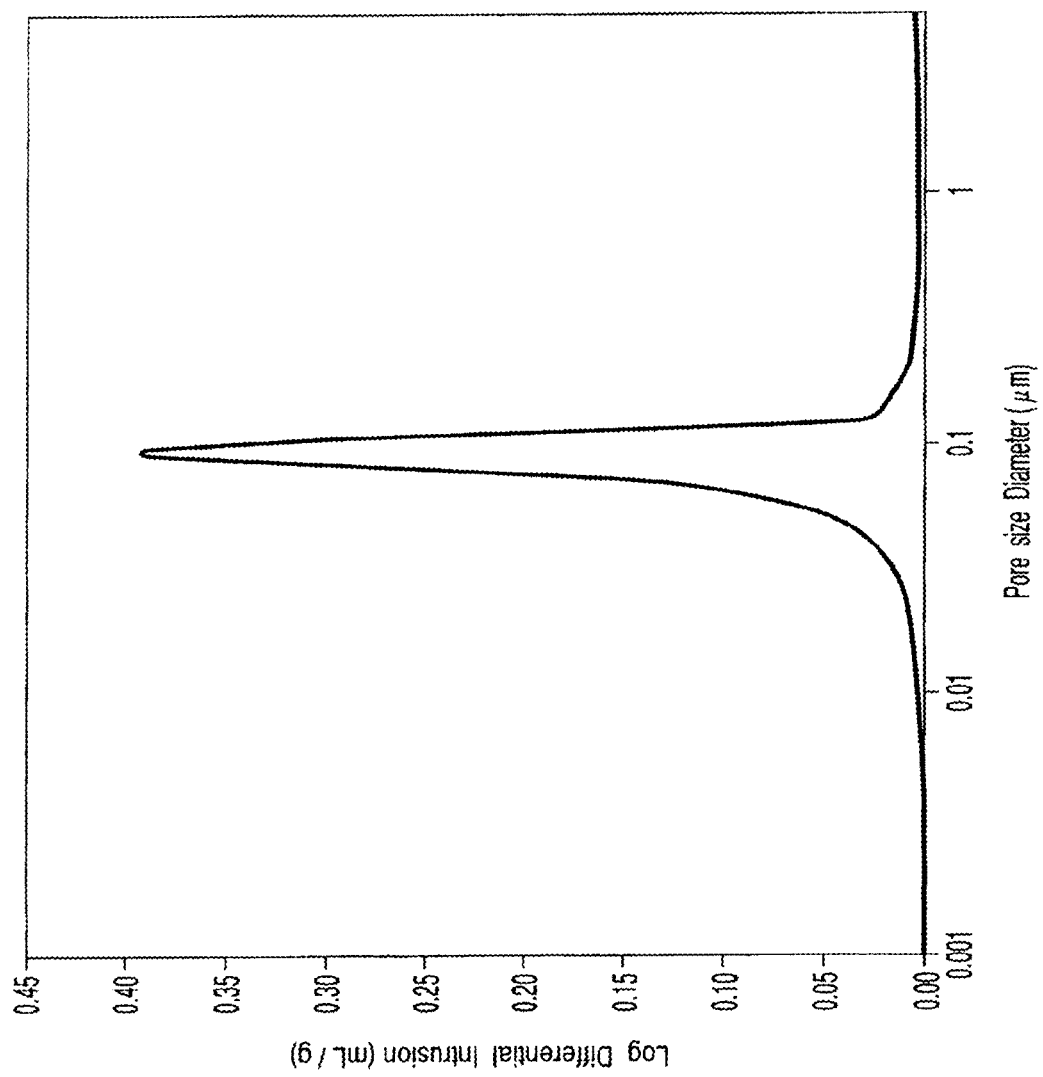
FIG. 7 is a graph showing the pore diameter distribution as determined by the mercury porosimetry in the negative electrode for Example 3.
Figure 8:
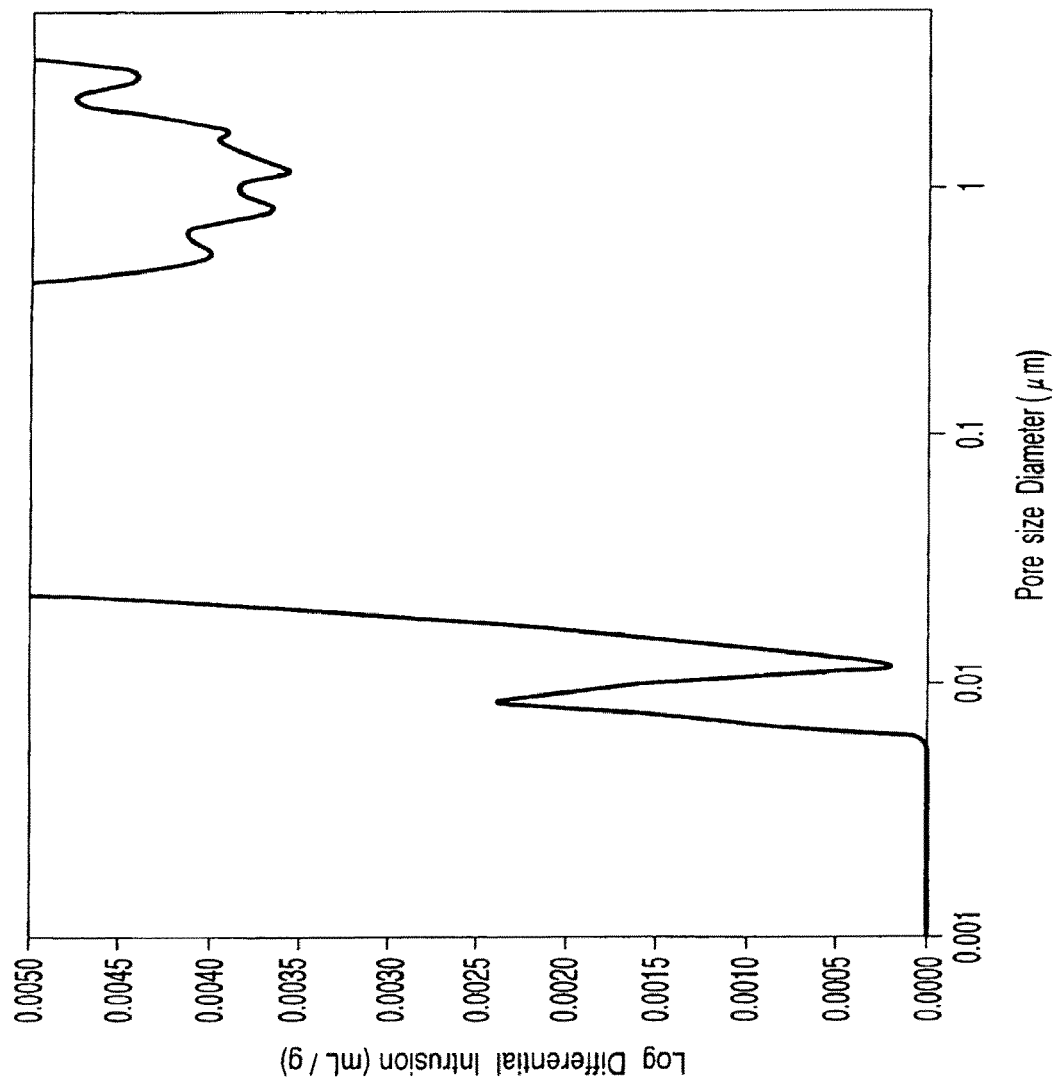
FIG. 8 is a graph showing in a magnified fashion that region of the pore diameter distribution shown in FIG. 7 which is in the vicinity of 0.01 μm of the diameter.

FIGS. 7 and 8 are graphs each showing the pore diameter distribution as determined by mercury porosimetry in respect of the negative electrode included in the nonaqueous electrolyte secondary battery for Example 3. The graph of FIG. 7 shows that the first peak has a mode diameter of 0.095 µm (which corresponds to Example 3). FIG. 8 shows in a magnified fashion that region of the pore diameter distribution shown in FIG. 7 which is in the vicinity of 0.01 µm of the pore diameter. The graph of FIG. 8 indicates that the second peak has a mode diameter of 0.0085 µm. Incidentally, the pore volume (mL) per gram of the negative electrode including the current collector is plotted on the ordinate of each of the graphs shown in FIGS. 7 and 8.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A negative electrode, comprising:
a current collector; and
a negative electrode layer being supported by the current collector, and the negative electrode layer comprising an active material having a Li ion insertion potential not lower than 0.4V (vs. Li/Li$^+$);
wherein:
the negative electrode has a porous structure;
a pore diameter distribution of the negative electrode as determined by a mercury porosimetry, which includes a first peak having a mode diameter falling within a range of 0.01 to 0.2 µm, and a second peak having a mode diameter falling within a range of 0.003 to 0.02 µm;
a volume of pores having a diameter of 0.01 to 0.2 µm as determined by the mercury porosimetry is 0.05 to 0.5 mL per gram of the negative electrode excluding the weight of the current collector; and
a volume of pores having a diameter of 0.003 to 0.02 µm as determined by the mercury porosimetry is 0.0001 to 0.02 mL per gram of the negative electrode excluding the weight of the current collector.

2. The electrode according to claim 1, wherein a surface area of pores having a diameter of 0.01 to 0.2 µm as determined by the mercury porosimetry, which falls within a range of 5 to 50 m$^2$ per gram of the negative electrode excluding the weight of the current collector, and a surface area of pores having a diameter of 0.003 to 0.02 µm as determined by the mercury porosimetry, which falls within a range of 0.1 to 10 m$^2$ per gram of the negative electrode excluding the weight of the current collector.

3. The electrode according to claim 1, wherein a surface area of pores having a diameter of 0.01 to 0.2 µm as determined by the mercury porosimetry, which falls within a range of 7 to 30 m$^2$ per gram of the negative electrode excluding the weight of the current collector, and a surface area of pores having a diameter of 0.003 to 0.02 µm as determined by the mercury porosimetry, which falls within a range of 0.2 to 2 m$^2$ per gram of the negative electrode excluding the weight of the current collector.

4. The electrode according to claim 1, which has a pore volume as determined by the mercury porosimetry, which falls within a range of 0.1 to 1 mL per gram of the negative electrode excluding the weight of the current collector.

5. The electrode according to claim 1, which has a pore volume as determined by the mercury porosimetry, which falls within a range of 0.2 to 0.5 mL per gram of the negative electrode excluding the weight of the current collector.

6. The electrode according to claim 1, wherein the mode diameter of the first peak of the pore diameter distribution falls within a range of 0.02 to 0.1 µm.

7. The electrode according to claim 1, wherein the mode diameter of the second peak of the pore diameter distribution falls within a range of 0.005 to 0.015 μm.

8. The electrode according to claim 1, wherein the volume of pores having a diameter of 0.01 to 0.2 μm as determined by the mercury porosimetry, which falls within a range of 0.1 to 0.3 mL per gram of the negative electrode excluding the weight of the current collector.

9. The electrode according to claim 1, wherein the volume of pores having a diameter of 0.003 to 0.02 μm as determined by the mercury porosimetry, which falls within a range of 0.0005 to 0.01 mL per gram of the negative electrode excluding the weight of the current collector.

10. The electrode according to claim 1, wherein the active material includes lithium titanate having a spinel structure.

11. The electrode according to claim 1, wherein the active material is formed of particles having an average particle diameter not larger than 1 μm.

12. The electrode according to claim 1, wherein the current collector is formed of an aluminum foil or an aluminum alloy foil.

13. The electrode according to claim 12, wherein each of the aluminum foil and the aluminum alloy foil has an average crystal grain size not larger than 50 μm.

14. A negative electrode, comprising:
a current collector; and
a negative electrode layer being supported by the current collector, and the negative electrode layer comprising a lithium-titanium oxide;
wherein:
the negative electrode has a porous structure;
a pore diameter distribution of the negative electrode as determined by a mercury porosimetry, which includes a first peak having a mode diameter falling within a range of 0.01 to 0.2 μm, and a second peak having a mode diameter falling within a range of 0.003 to 0.02 μm;
a volume of pores having a diameter of 0.01 to 0.2 μm as determined by the mercury porosimetry is 0.05 to 0.5 mL per gram of the negative electrode excluding the weight of the current collector; and
a volume of pores having a diameter of 0.003 to 0.02 μm as determined by the mercury porosimetry is 0.0001 to 0.02 mL per gram of the negative electrode excluding the weight of the current collector.

15. The electrode according to claim 14, wherein the lithium-titanium oxide has a spinel structure.

* * * * *